US006525878B1

(12) United States Patent
Takahashi

(10) Patent No.: US 6,525,878 B1
(45) Date of Patent: Feb. 25, 2003

(54) 3-D VIEWING SYSTEM

(75) Inventor: Susumu Takahashi, Iruma (JP)

(73) Assignee: Olympus Optical Co., Ltd., Tokyo (JP)

( * ) Notice: Subject to any disclaimer, the term of this patent is extended or adjusted under 35 U.S.C. 154(b) by 0 days.

(21) Appl. No.: 09/686,976

(22) Filed: Oct. 12, 2000

(30) Foreign Application Priority Data

Oct. 15, 1999 (JP) .......................................... 11-293675

(51) Int. Cl.[7] ......................... G02B 27/22; G02B 21/22; A61B 1/04
(52) U.S. Cl. ....................... 359/466; 359/462; 359/376; 359/377; 359/378; 359/380; 600/111; 600/166
(58) Field of Search ................................ 359/462, 374, 359/375, 376, 377, 378, 381, 466; 600/111, 112, 118, 166, 181; 348/42

(56) References Cited

U.S. PATENT DOCUMENTS

| | | | |
|---|---|---|---|
| 5,552,929 A | | 9/1996 | Fukaya et al. |
| 5,579,722 A | * | 12/1996 | Kinukawa et al. ........... 359/377 |
| 5,668,661 A | * | 9/1997 | Tomioka ..................... 359/377 |
| 5,689,365 A | * | 11/1997 | Takahashi ................... 359/378 |
| 5,706,061 A | * | 1/1998 | Marshall et al. ............ 348/743 |
| 5,760,827 A | * | 6/1998 | Faris ........................... 348/42 |
| 5,867,309 A | | 2/1999 | Spink et al. |
| 6,144,762 A | * | 11/2000 | Brooks ........................ 600/113 |
| 6,348,994 B1 | * | 2/2002 | Geier et al. .................. 359/462 |

FOREIGN PATENT DOCUMENTS

JP          H5-107482      4/1993

\* cited by examiner

*Primary Examiner*—Audrey Chang
(74) *Attorney, Agent, or Firm*—Arnold International; Bruce Y. Arnold

(57) ABSTRACT

A 3-D viewing system is disclosed that enables multiple operators to share a common objective element while readily adjusting the orientation of images that are displayed to one or more moveable display units. The orientation of images that are displayed at a movable display unit can be made to automatically depend on the position/orientation of the display unit. Thus greater freedom in viewing postures is provided than previously available in 3-D viewing systems that share a common objective element, and each operator may view a 3-D image with proper perspective for his position/orientation. In order to reduce the number of optical components, the need to adjust optical components, and reduce costs, images from at least two different optical perspectives may be time-division multiplexed onto a single optical detecting device. Moreover, wide-angle, electronic color displays are disclosed which demodulate time-multiplexed image signals having two different parallaxes in a manner that dispenses with the need for wearing polarized glasses in order to experience a wide-angle, 3-D viewing experience. An electronic image display unit demultiplexes image data using left and right LED sets that are energized in sequence to emit up to three color light beams toward the left and right eyes of a viewer, at a frequency higher than 30 times per second. The light beams are then modulated with the image data for that color component using one or more high-speed, image modulators. Such modulators may be formed of transmissive or reflective liquid crystals in a known manner, or by an array of DMD's that are controlled in a binary fashion to reflect light for a given pixel within or outside an exit pupil of the display. If DMD's are used as the modulator, the duty cycle for a given pixel may be controlled in order to provide gradation of the display brightness for that pixel.

19 Claims, 22 Drawing Sheets

FIG. 7
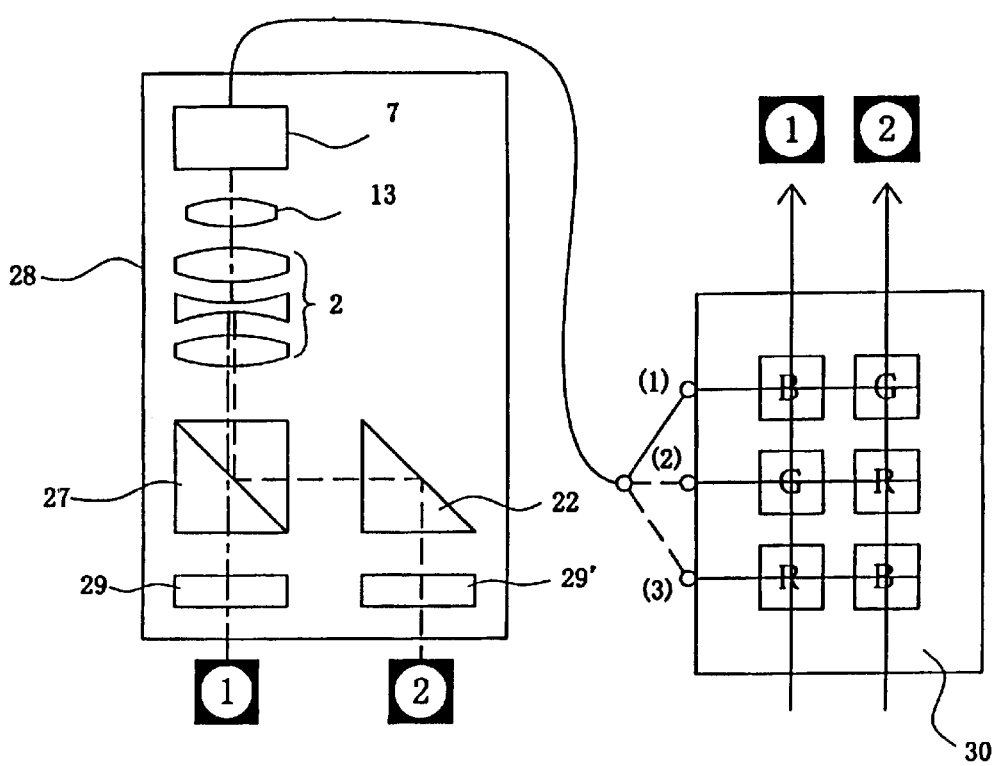
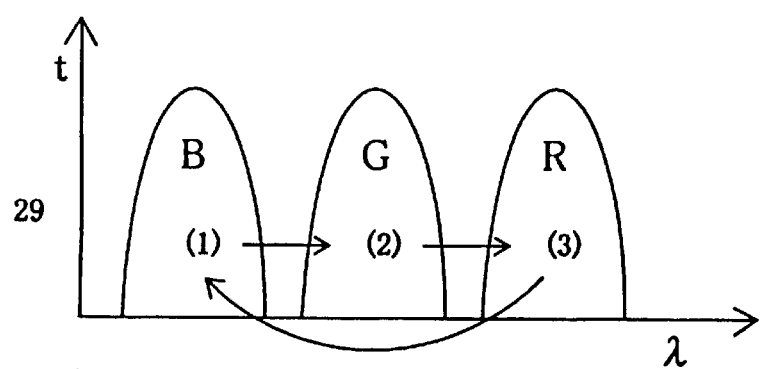
FIG. 8A
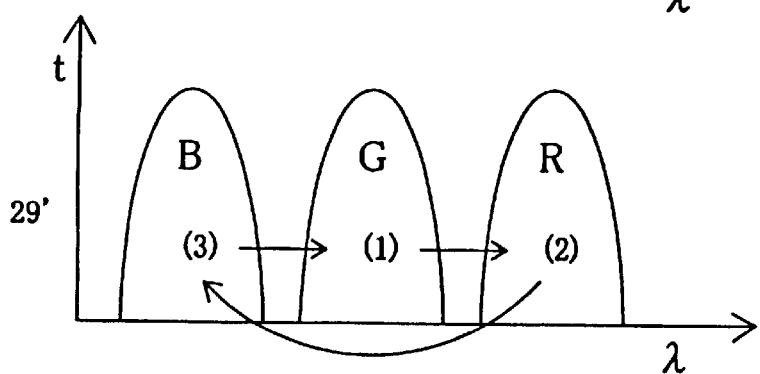
FIG. 8B

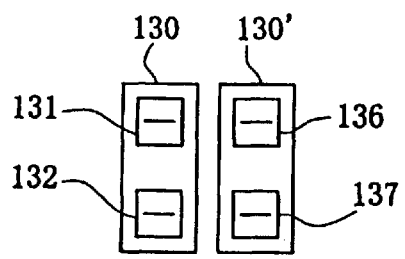
FIG. 22 (PRIOR ART)
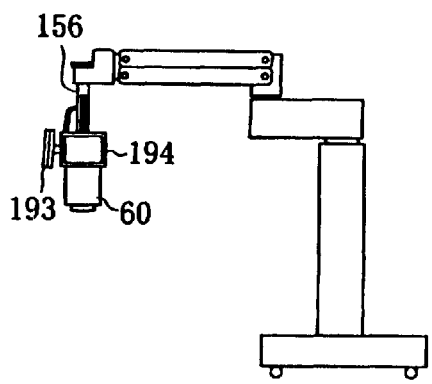
FIG. 23 (PRIOR ART)
FIG. 24 (PRIOR ART)
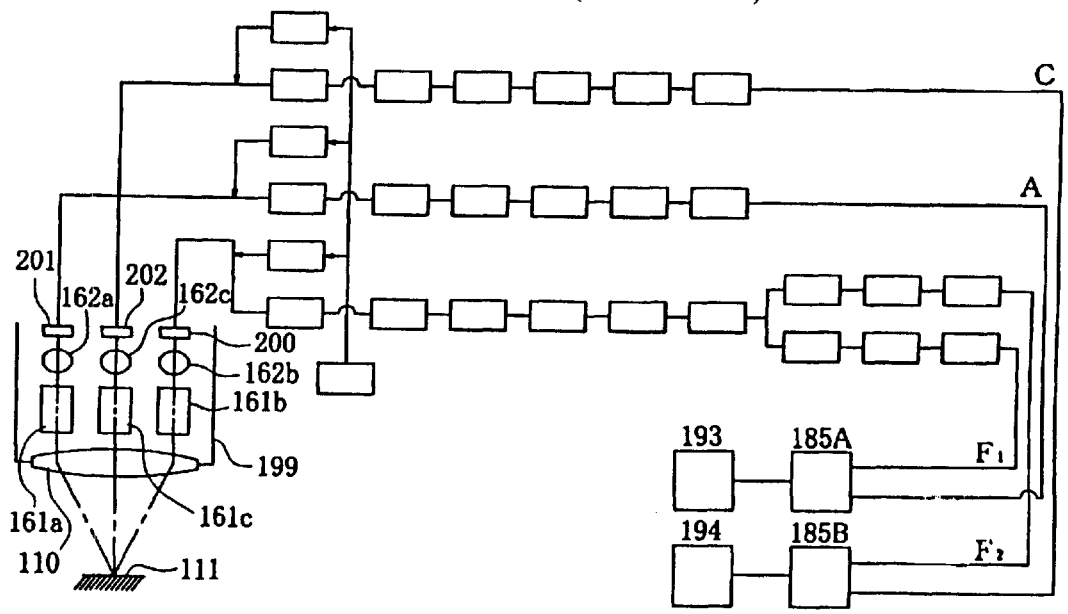

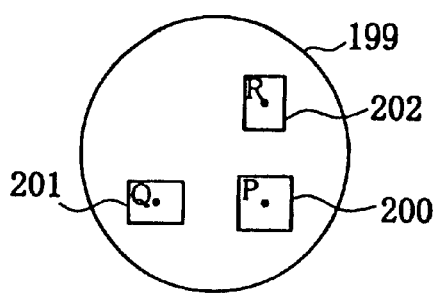
FIG. 25 (PRIOR ART)
FIG. 26 (PRIOR ART)
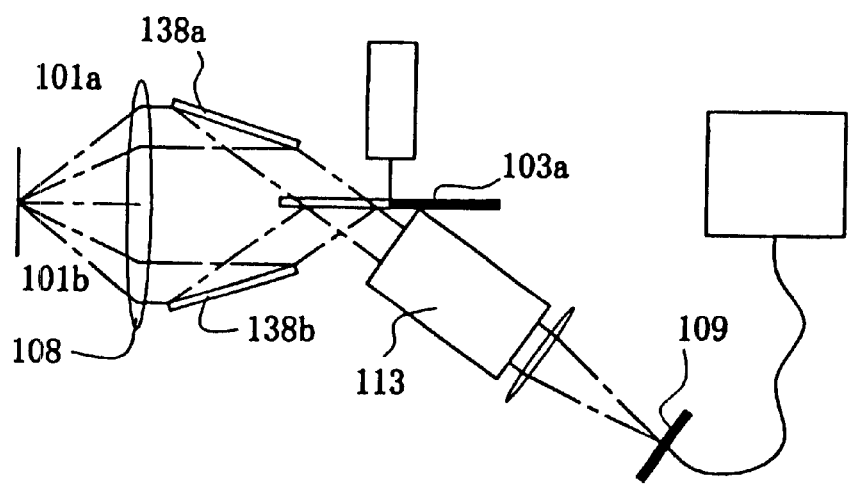
FIG. 27 (PRIOR ART)
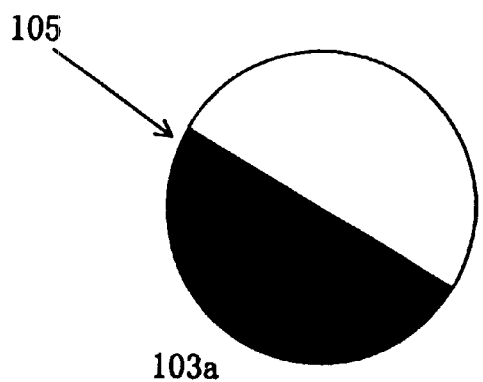

3-D VIEWING SYSTEM

BACKGROUND OF THE INVENTION

Three-dimensional (3-D) viewing units and electronic image display units according to the prior art have been described in Japanese Laid Open Patent Applications H5-107482 and H9-511343. As described in Japanese Laid Open Patent Application H5-107482, surgical microscopes that image light fluxes, convert the images into electrical signals, and then display the images are advantageous in that a weaker light can be used to illuminate ophthalmic operations. The weaker illuminating light not only presents less of a problem if directed directly into a patient's retina, but it also reduces surface evaporation due to the light at the illuminated surface being converted into heat. Thus, less saline solution is needed during an operation to prevent the operation site from drying out. However, prior art surgical microscopes using electronic displays retain the following obstacles to increased usage.

1) They provide less freedom to the main operator in his viewing position and head orientation (hereinafter viewing position and head orientation will be termed, for convenience, viewing posture). Further, the assistant operator is provided with very limited viewing postures, namely, either directly opposite the operator facing the operator or at the operator's side facing a direction that makes a right angle to the forward direction of the operator.

2) When the operator and assistant share a common optical system, the prior art devices require too much adjustment. For example, when the operator and assistant take side-by-side positions, they share an optical viewing system between them. Three optical zoom systems are usually provided in order to offer the user a selection of magnifications with which to view the operation. However, it is very difficult to adjust the optical axis, magnification, and co-focus of the three optical zoom systems for multiple viewers. Thus, it is desired for surgical microscopes using electronic displays to provide more freedom in terms of viewing posture of the operator and assistant without requiring complex adjustments of the optical system.

3) In order that multiple users, such as both the operator and assistant, can have an independent observation capability, prior art surgical microscopes that use electronic displays provide each viewer with an individual imaging system and individual optical viewing system. However, this results in an increase in size of the surgical microscope, more difficulty in adjustment, and greater cost as compared to the present invention.

In prior art surgical microscopes that provide wide-angle, 3-D images, the viewers must wear polarized glasses as they view a large display monitor that displays wide-angle images. If polarized glasses are not used, the left eye receives not only the images displayed on the monitor intended for the left eye, but also the images having different parallax that are intended for the right eye. Similarly, the right eye also sees double images. Thus, rather than experiencing wide-angle, 3-D images, the viewer experiences only blurred 2-D images if polarized glasses are not worn. Further, both wide-angle images and proper eye relief may not be realized at the same time in prior art devices.

Prior art devices relating to problems (1), (2), and (3) above are discussed in more detail below.

Japanese Laid Open Patent Application H 9-511343 describes a method to reduce the number of optical zoom systems. However, no consideration is given to the limited viewing postures available to the operator and assistant or of giving these viewers more freedom of viewing posture.

Japanese Laid Open Patent Application H5-107482 describes an example of a 3-D viewing system according to the prior art, wherein two viewers view an operation site from positions that are opposed to each other. This example is described with reference to FIGS. 20–22. FIG. 20 is a schematic front elevation view of such a device. FIG. 21 is a side view of the device shown in FIG. 20, and FIG. 22 is a partial, top view which illustrates the opposed directions in which the two pairs of monitors are directed. A microscope body 106' (FIG. 20) comprising an optical system and imaging section is provided with a viewing section supporting member 138 (FIG. 21). The viewing section supporting member 138 is provided with rotation axes 134, 134' for rotationally supporting the back of viewing sections 130, 130', as well as a first left monitor 131 for the left eye (FIG. 20) having an eye shade 131a and a first right monitor 132 for the right eye having an eye shade 132a. These side-by-side monitors are connected to the viewing section 130' by a rotation supporting member 133 (FIG. 20). Similarly, a second left monitor 137 for the left eye (FIG. 22) and a second right monitor 136 for the right eye are provided to the viewing section 130'. As shown in FIG. 22, the monitors 131, 132 display to the left in the figure and the monitors 136, 137 display to the right in the figure.

Therefore, by orienting the detecting devices that are fixed within the microscope body so that the left and right parallax images that are detected are displayed with a correct vertical orientation for the user, each operator is provided with a 3-D viewing experience using the viewing sections 130, 130'. In this case, the operators do not need to wear polarized glasses. Rather, a monitor is provided for each eye, each eye views only its monitor, and no obstacles to viewing, such as the wearing of polarized glasses, are present. However, a wide-angle 3-D image is not obtained and the viewing positions are limited to the opposed positions illustrated. Viewing at the side of the operator is not available. Because a user has little freedom in choice of viewing postures, the viewing experience may be tiresome.

As mentioned previously, the field of view is limited in systems that use two display units (for instance the left and right monitors 131, 132) in order to provide images to the left and right eyes, respectively. In order to display wide-angle images, both the left and right display panels would need to be enlarged. However this would cause the two display panels to physically interfere with each other. In addition, in this prior art device, each imaging section is provided with an optical zoom system. Enlarging these optical zoom systems would likely lead to adjustment problems and oversized systems.

Japanese Laid Open Patent Application H5-107482 also describes another prior art device of a 3-D viewing system, wherein the operator and assistant view at right angles to each other. This embodiment is described with reference to FIGS. 23–25. FIG. 23 is a schematic side view of a prior art 3-D viewing system that shows how two side-by-side viewers view 3-D images while facing 90 degrees to each other. FIG. 24 is a block diagram of the microscope body and electric wiring of this device. FIG. 25 is a top view showing the locations of optical paths P, Q, R (each passing light of different perspective relative to the operation site) which are detected by solid-state image detecting devices positioned within the microscope body 199. As shown in FIG. 23, the microscope body (not separately labeled in this figure) is fixed to a supporting arm 156 which is provided with liquid crystal monitors 193, 194. Being supported so as to be spatially movable, the microscope body 199 (FIG. 24) is provided with an illumination system (not shown), an objective lens 110, three magnifying systems 161a, 161b, 161c, and relay lenses 162a, 162b, 162c. Further, a solid-state image detecting device 200, 201, or 202 is positioned in the optical paths P, Q, or R (FIG. 25), respectively, with the solid-state image detecting device 202 having an orientation that is rotated counter-clockwise 90° relative to the orientation of the solid-state image detecting device 201.

In this prior art device, in 3-D image circuit 185A, an internal switching circuit (not shown) alternates in time sequence picture signals F1 and picture signals A as input signals to create time-multiplexed image signals which are output to a liquid crystal monitor 193. A liquid crystal driving circuit (not shown) drives electrodes attached to the back surface of the liquid crystal monitor 193 so as to rotate the polarization of the displayed images in synchronism with the switching of the switching circuit. Thus, at the liquid crystal monitor 193, the time-multiplexed picture signals A detected from the optical path Q and the picture signals F1 detected from the optical path P are displayed with different polarizations. By wearing polarized glasses (not shown), cross-talk between these images is avoided, thereby enabling the left eye of the viewer to see only those images captured from a left perspective optical path, and the right eye of the viewer to see only those images captured from a right perspective optical path. Thus, a viewer experiences a 3-D viewing sensation of the operation site 111. In a similar manner, the 3-D image circuit 185B and the liquid crystal monitor 194, display picture signals F2 on the optical path P and the picture signals C on the optical path R, in a time-division manner, with different polarizations. Polarized glasses worn by the other viewer prevent the images intended for that viewer's right eye (i.e., the images from a right perspective optical path) from entering the viewer's left eye, and vice-versa. Thus, each viewer perceives 3-D images of the operation site 111. According to this prior art device, three optical viewing paths are used. One path is observed by one operator, one path is observed by the other operator, and one path is shared so as to be observed by both operators. The images on the path they share are processed so as to present a correct vertical orientation to each operator. Each operator is provided with two images (one for each eye) having different parallax, with the display images having a proper vertical orientation for each viewer's position relative to the operation site so as to create the perception of viewing a 3-D image with proper orientation for that viewer's position. In addition, more free space is available to the operators because the circuit parts are all stored within tables and the microscope body may be small, since the optical objective 110 is shared. However, in this prior art device, the operator and assistant view can only view from positions such that the directions of view are at a right angle to each other; thus, the viewing postures are again limited. In this prior art device, no consideration is given to providing a pair of liquid crystal monitors that may be adjusted about the axis of the microscope body so that the monitors are easier to view or so that the operator's viewing posture may be varied. Furthermore, an optical zoom system must be provided for each image detecting device, which makes adjustment troublesome and the size of the microscope larger. Furthermore, this device requires the operators to wear polarized glasses, which is inconvenient.

Japanese Laid Open Patent Application H9-511343 also describes prior art electronic image input and output techniques that employ time-multiplexing and demultiplexing.

First, the electronic image input technique in this publication will be described. A zoom lens is shared in the image input section, and the left and right images are input in a time-division manner. This will be described with reference to FIGS. 26 and 27. FIG. 26 is a schematic diagram showing an improvement in inputting and outputting electronic images. FIG. 27 is a top view of an optical path switching element of the prior art device. As shown in FIG. 26, right and left optical paths 101a, 101b and a rotation switch element 103a are provided. As shown in FIG. 27, the rotation switch element 103a is structured on a thin glass plate (disk) 105. One of the major characteristics of the optical paths 101a, 101b is that the distances along both paths from the object (at the operation site) to optical zoom system 113 are the same. Similarly, the distances along both paths from the object to image detecting device 109 are equal. This results from the symmetry of the two mirrors 138a, 138b about the center axis of main objective lens 108. Images are captured by the image detecting device 109 in a time-division manner using the rotation switch element 103a. Next, the electronic image output technique that is disclosed in this publication for demultiplexing these time-multiplexed left and right images will be discussed.

FIG. 28 is a horizontal sectional view illustrating the configuration of a device disclosed in the above-mentioned publication that demultiplexes the two time-multiplexed images. As shown in this figure, the images are displayed on a single display which alternately feeds light from the display into to two ocular lens paths 101c and 101d in synchronism with the displayed images. In this device, equal length optical paths are realized using a prism. An optical path switching element 103a allows alternate images from the display to be transferred to the ocular paths 101c, 101d in a time-division manner. Thus, the left eye of a viewer will receive only images having a left perspective and the right eye of a viewer will receive only images having a right perspective if the motor that drives the optical path switching element 103a is properly synchronized with the alternately displayed left and right images on the single monitor. In this manner, a color 3-D viewing experience may be provided that does not require the viewer to wear polarized glasses. However, this prior art device can not realize both a wide-angle field of view and have a large eye relief Further, this publication does not disclose, when using multiplexing/demultiplexing of the images, how two operators (e.g., an operator and the assistant) can view an object while sharing a common optical objective, or how they may change their viewing postures and have the images that are presented automatically be adjusted in orientation for the new viewing posture. Therefore, a surgical microscope which is desirable for operators as described above is not realized.

BRIEF SUMMARY OF THE INVENTION

The purpose of the present invention is to provide a 3-D viewing system for surgical microscopes wherein light flux images at different locations (i.e., having different parallax) are transformed into electronic images, which are then displayed on one or more electronic display units, and in which:

(1) the operator and assistant are given more freedom in selecting viewing postures, and there is less adjustment required by the viewer as a result selecting a different viewing posture;

(2) despite there being more freedom in selecting viewing postures, it is unnecessary to enlarge the microscope body, resulting in cost savings; and (3) an electronic image display unit is provided that enables wide-angle, color or black and white, images to be viewed so that wide-angle, 3-D images may be perceived without wearing polarized glasses.

Thus, the microscope viewing system of the present invention is easier to use while providing more freedom of viewing postures than prior art devices. Further, the microscope viewing system of the present invention is safer for the patient than microscope viewing systems that do not use electronic display units.

BRIEF DESCRIPTION OF THE DRAWINGS

The present invention will become more fully understood from the detailed description given below and the accompanying drawings, which are given by way of illustration only and thus are not limitative of the 3-D viewing system of the present invention, wherein:

FIG. 7 shows a modified image detecting unit of Embodiment 5;

FIGS. 8A and 8B show curves of the transmittance t versus wavelength λ of the devices 29 and 29', respectively, of Embodiment 5;

FIG. 22 is a partial, top view of the system shown in FIG. 20, illustrating the two opposed directions of the monitor display surfaces;

FIG. 23 is a side view of a prior art, 3-D viewing system showing how two side-by-side viewers can view 3-D images while facing 90 degrees to each other;

FIG. 24 is a schematic diagram of a microscope body and the associated wiring of components of a prior art 3-D viewing system;

FIG. 25 is a top view showing the locations of three optical paths within the microscope body of the prior art 3-D viewing system shown in FIG. 24;

FIG. 26 is a schematic diagram showing an improvement in inputting and outputting electronic images;

FIG. 27 is a top view of an optical path switching element of the prior art.

DETAILED DESCRIPTION

Figure 1:
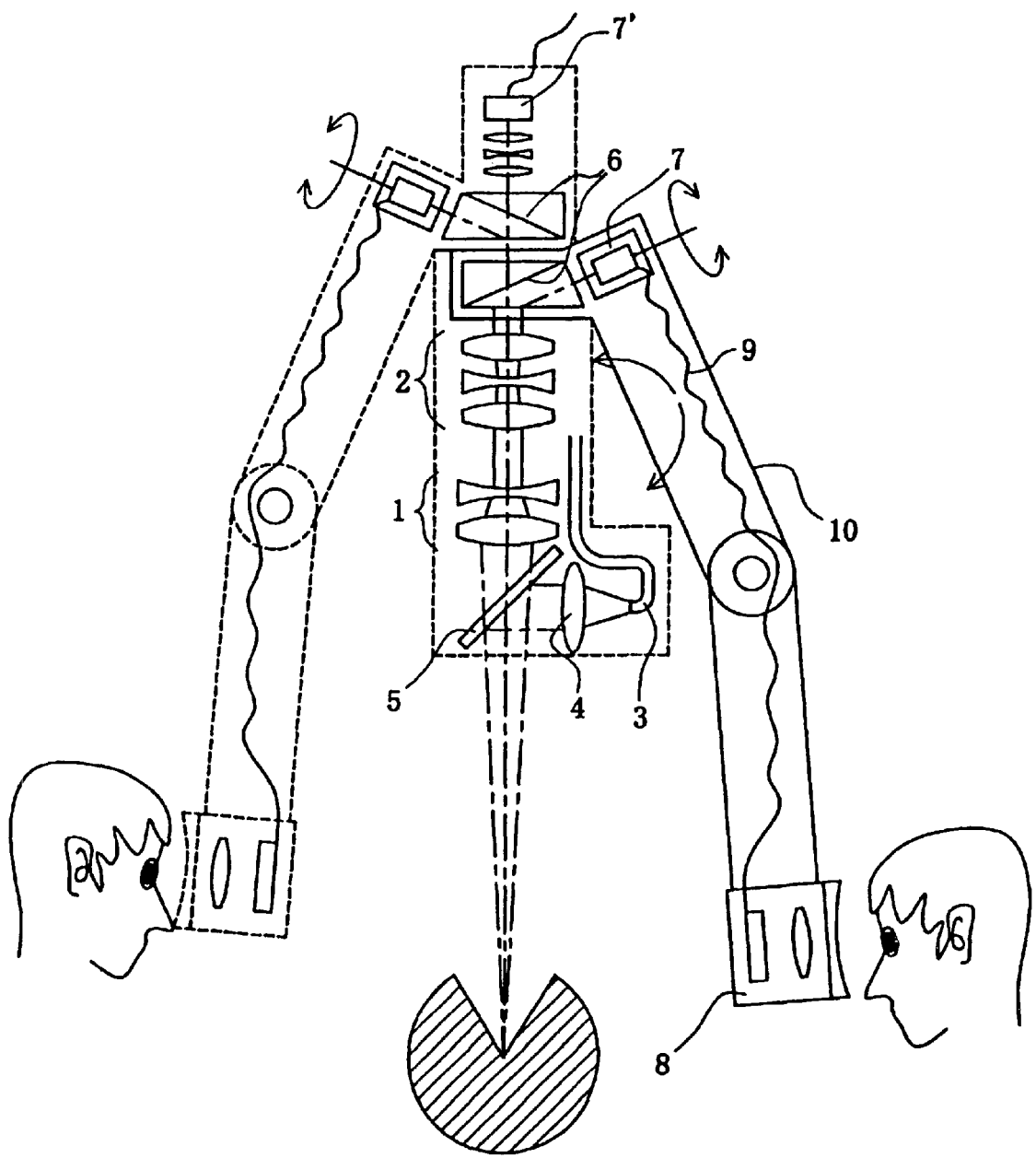
FIG. 1 is a side, sectional view of the entire surgical microscope of Embodiment 1.

The present invention is an improvement in a 3-D viewing system of a microscope which includes a single optical objective section that is shared among all users of the microscope, an optical imaging section, an image detecting unit that detects images of an object from at least two perspectives, and one or more electronic display units, wherein optical images that are acquired by at least one image detecting device in the image detecting unit are transformed into electrical signals which are then displayed on one or more electronic display units so as to create a 3-D viewing experience. The 3-D viewing system is especially useful in viewing surgical procedures.

The improvement involves providing the 3-D viewing system with:

(a) a moveable electronic image display unit that displays images which have been captured by the image-detecting unit; and (b) means to change images that are displayed by the moveable electronic image display unit in response to a change in location or orientation of the moveable electronic image display unit.

The image detecting unit and electronic image display unit may be mechanically linked so that the image detecting unit is re-positioned in real time when the electronic image display unit is re-positioned so as to remain before an observer as the observer changes viewing postures. Also, the location detecting unit may employ remote sensing using a prior art navigation system, as will be discussed below. A selection mechanism, such as a mechanical clutch or electric switch, may be provided to select among either a mechanically linked mode or a mode wherein the location of the electronic image display unit and the location of the image detecting unit are not mechanically linked. The electronic image display unit(s) may be separated from the image detecting unit. For instance, head-mounted image display units which are separated from the surgical microscope itself, but receive input data via cable or wireless means from the microscope, may be used. A beam splitter, (e.g., one formed of a pair of joined prisms, a mirror, a polarizing beam splitter, and so on), is provided on the optical path of the optical viewing system. An image detecting unit is provided on each divided optical path created by the beam splitter. The beam splitter and the image detecting unit are rotated as a unit around the optical axis of an optical viewing system. Furthermore, each image detecting unit conveys images to be captured that have passed either through a left aperture and a right aperture, or have been reflected by a left mirror and a right mirror which similarly confine the light to light bundles having different perspectives. Images, detected using light from different perspectives, may be modulated by a modulation device having a characteristic property, such as its transmission as a function of wavelength, that is changed sequentially in time in a repeating fashion.

Alternatively, four apertures may be provided on one side of an optical system. Images are then captured from the light passing these four apertures. Among the captured images, two are selected and displayed per observer, each after being adjusted in orientation if needed, in order for the observer to experience 3-D images that correspond automatically to the view that would be seen from the observer's position.

An electronic image display unit may display left and right images on respective left and right electronic displays, sequentially on a single, wide-angle, electronic display, or sequentially on multiple electronic displays arranged either side-by-side horizontally or stacked vertically for wide-angle viewing.

The present invention may employ image modulators selected from among the following types:

(1) digital micro mirror devices (hereinafter termed DMD's), in which tens to hundreds of thousands of micro mirrors, sized from several microns to several tens of microns, are arranged, for example, in a two-dimensional matrix. The orientation of the DMD's may be controlled among two different angles, such as 5° and 15°, as determined by the phase of an alternating current used to drive the DMD's. The micro mirror arrays, preferably, are driven by an a–c current having a frequency of at least 30 cycles per second; however, the minimum frequency depends on the application and may be much higher;

(2) reflective liquid crystal display units, and/or (3) transmission liquid crystal display units.

Further, the present invention also employs DMD's as an optical path switching means, for example, to convey light having two different perspectives to a single image detecting device in a time-division manner so as to reduce the number of optical components and decrease cost. By decreasing the number of optical components, fewer adjustments of optical components are needed.

For each image display panel, a magnifying lens having a large aperture may be positioned on the side of the viewer from the display panel. An eye shade may be provided at the periphery of the magnifying lens. Eye relief may vary from 10 mm to 100 mm. Left and right illumination sources, of three different wavelength ranges or of a single wavelength range, may be energized in synchronism with left and right images that are displayed by one or more image modulators in response to image signals received from the image detection unit(s) so as to produce color or monochrome images.

Various embodiments of the present invention will now be described with reference to the figures.

Embodiment 1

FIG. 1 is a side, sectional view of the entire surgical microscope of Embodiment 1 of the 3-D viewing system according to the present invention. An optical viewing system and an optical illumination system are provided in the microscope body. The optical viewing system comprises variable objective lenses 1 and an optical zoom system 2. In the optical illumination system, light from a light source (not shown) passes through a light guide 3 and illuminates the surface of an object via a half mirror 5 after being adjusted to a desired convergence angle via an illumination lens 4. Two beam splitters 6, 6 are provided, one for each viewer (operator and assistant) on the optical axis of the optical zoom system 2 within the optical viewing system. At least one of the beam splitters 6,6, (the lower one in this figure) is integrally fixed within an arm 10. Arm 10 is mounted so as to be rotatable around the optical axis of the zoom system 2, which substantially corresponds with the axis of the cylindrical microscope body. Thus, the lower beam splitter 6 is rotationally mounted relative to this axis. However, both beam splitters can be mounted so as to be rotatable about this axis. An aperture plate, having apertures L, R (see FIG. 2) which pass light for left and right images, respectively, is provided on the separate optical paths created by reflection from the beam splitters 6,6. In this embodiment, a separate image detecting device 7 is provided on each left and right optical path following each aperture.

The image detecting device 7 are electrically connected to respective, left and right, image display panels (i.e., monitors) 8,8 positioned in front of the viewer's left and right eyes, respectively, through a cable 9. An operator views electronic images captured by these pairs of image detecting devices 7. An image detecting device 7 is positioned in each light path following each aperture L, R. The captured images are then displayed on the left and right display panels, with the image data being input to these display panels through the cable 9. An image detecting device 7' is also provided in the transmitted light path of the beamsplitters 6,6 (i.e., on the optical path above the two beam splitters 6, 6) so that a third person can view an electronic image of the operation site. The light guide 3 used in this embodiment has a silicon core and fluoroplastic-coated monofilament cladding. This yields less transmission loss and is advantageous in terms of brightness because the core of this type of light guide has a larger effective area as compared with the summation of the effective areas of the cores of fiber-bundle type light guides.

As mentioned above, in this embodiment, the moveable arm 10 to the right in this figure, by reason of its design, automatically aligns the direction of the beam splitter 6 within it, as well as the left and right apertures within it, with the location of a viewer about the operation site, so long as the viewer repositions the arm 10 so as to remain in front of his head as he repositions himself to a new position. This automatic realignment of the display images to a proper orientation for the new position of the viewer occurs as a result of the beamsplitter 6 and display panels 8,8 being integrally mounted within the arm 10 so that they move, in synchronism with the arm, around the optical axis of the optical zoom system 2. In this way, when the operator to the right in the figure changes his viewing position from the illustrated position opposite the operator on the left to a new position, such as a position facing the plane of the figure, the operator on the right will automatically be presented with images appropriate for his new position. Since the left and right apertures as well as the lower prism 6 will rotate about the optical axis of the microscope body as the movable arm rotates about the axis of the microscope body, the images that are detected will continue to have an appropriate orientation for the new position.

Figure 2:
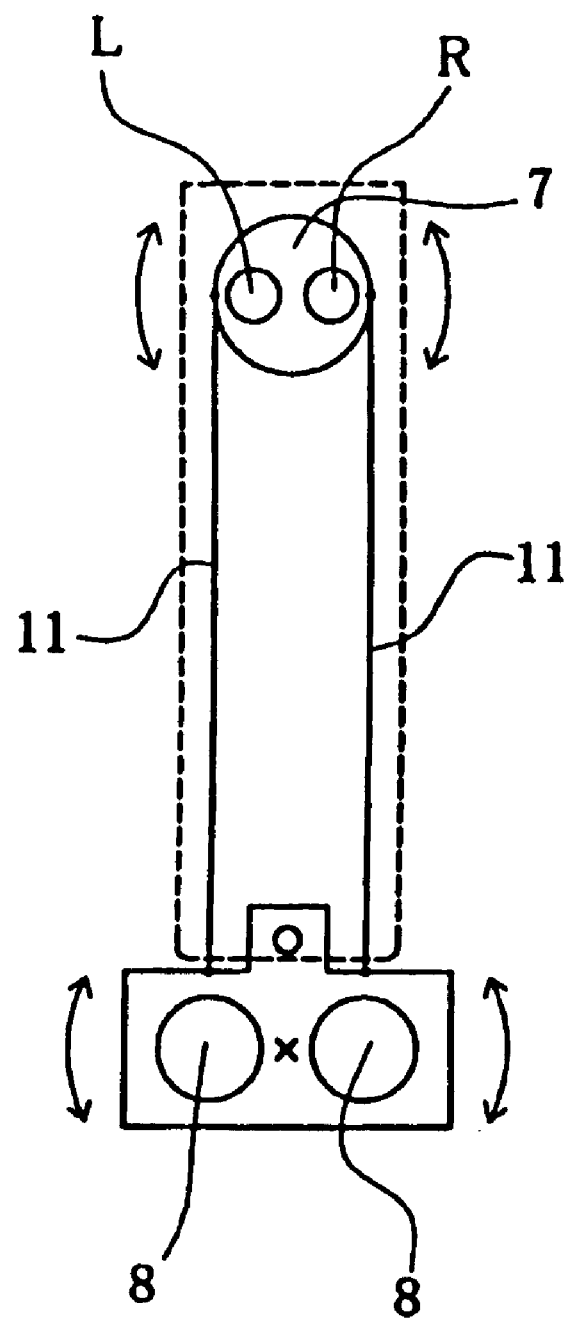
FIG. 2 shows the relationship between electronic display panels positioned before the left and right eye of a viewer and the left and right apertures of the surgical microscope of Embodiment 1, as well as of additional embodiments to be discussed below.

Further, the display panels 8,8, on each arm can be tilted, as illustrated by the arrows in FIG. 2. This allows for greater viewer comfort, as well as providing a different perspective view to the object, as will now be discussed. The left and right apertures L, R are in an aperture plate that is rotationally mounted about a center axis. Similarly, the left and right display panels 8,8 are rotationally mounted so as to be rotatable about an axis that is parallel to the center axis of the aperture plate. The display panels 8,8 and the left and right apertures are connected to each other through wires 11 so that a rotation of the display panels 8,8 causes a rotation of the apertures L, R. The viewer can select if the wires 11 connect the display panels 8, 8 to the apertures in order to synchronize their rotation. When they are connected to each other, the viewer can obtain left and right images having different parallaxes according to the tilt of the display panels in front of him.

Even in the case where one arm 10 is fixed in relation to the microscope body, both operators (i.e., a main operator and an assistant), can view electronic images having a perspective appropriate for each's position. Moreover, each operator can change his viewing posture, such as the tilt of his head. By merely repositioning the tilt of the display unit before him to correspond to his head tilt, the images that are displayed are automatically adjusted for the new orientation. Thus, the operators can change their viewpoint to the object without visual confusion because the images for each operator correspond in perspective to that operator's position and head orientation. In this embodiment, an optical focusing system (not shown) is provided after the left and right apertures for obtaining the left and right images. Because a common optical zoom system is provided in this embodiment, the left and right co-focus, magnification, and focus adjustments are easier than with prior art 3-D viewing systems.

Embodiment 2

Figure 3:
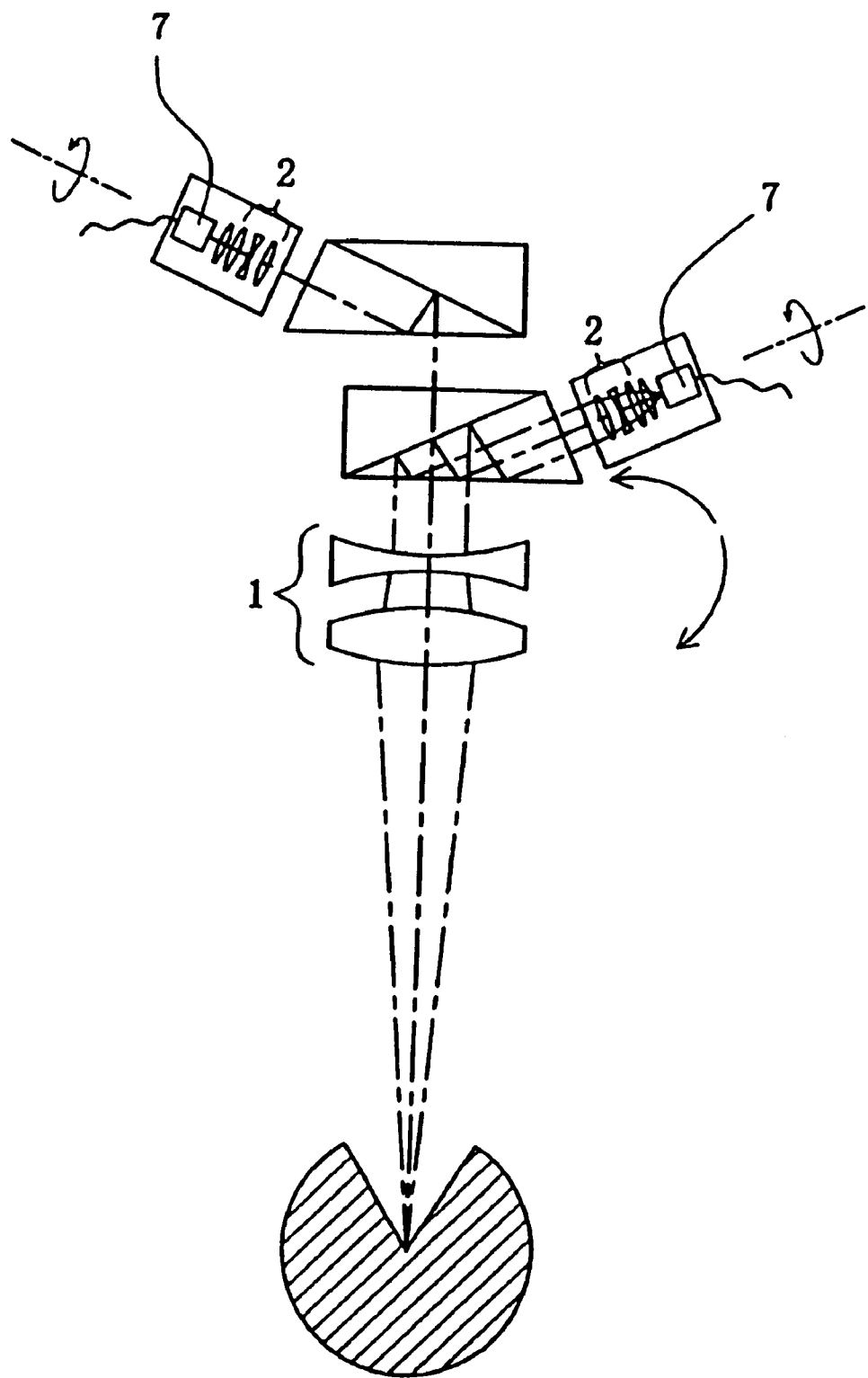
FIG. 3 is a schematic diagram of Embodiment 2 which shows only the structures which differ from Embodiment 2.

FIG. 3 is a schematic diagram that illustrates only those portions of Embodiment 2 that differ from Embodiment 1. In this embodiment, rather than a common optical zoom system being provided in the microscope body, individual zoom systems are provided in each optical path following a left or right aperture. Consequently, a total of four optical zoom systems are provided for the operator and assistant. Just as in Embodiment 1, the beam splitter 6 can be rotated around the optical axis according to the viewer position. The imaging section in which the left and right optical zoom systems 2 are mounted can also be rotated around the center axis of the left and right apertures. In this way, just as was shown for Embodiment 1, a main operator and an assistant can view images as if seen from their own position without changing the microscope body, even if they move their position or change their viewing posture. As before, the operators can change their viewpoint to the object without visual confusion because the images are automatically correlated to the position and orientation of each operator.

Embodiment 3

Figure 4:
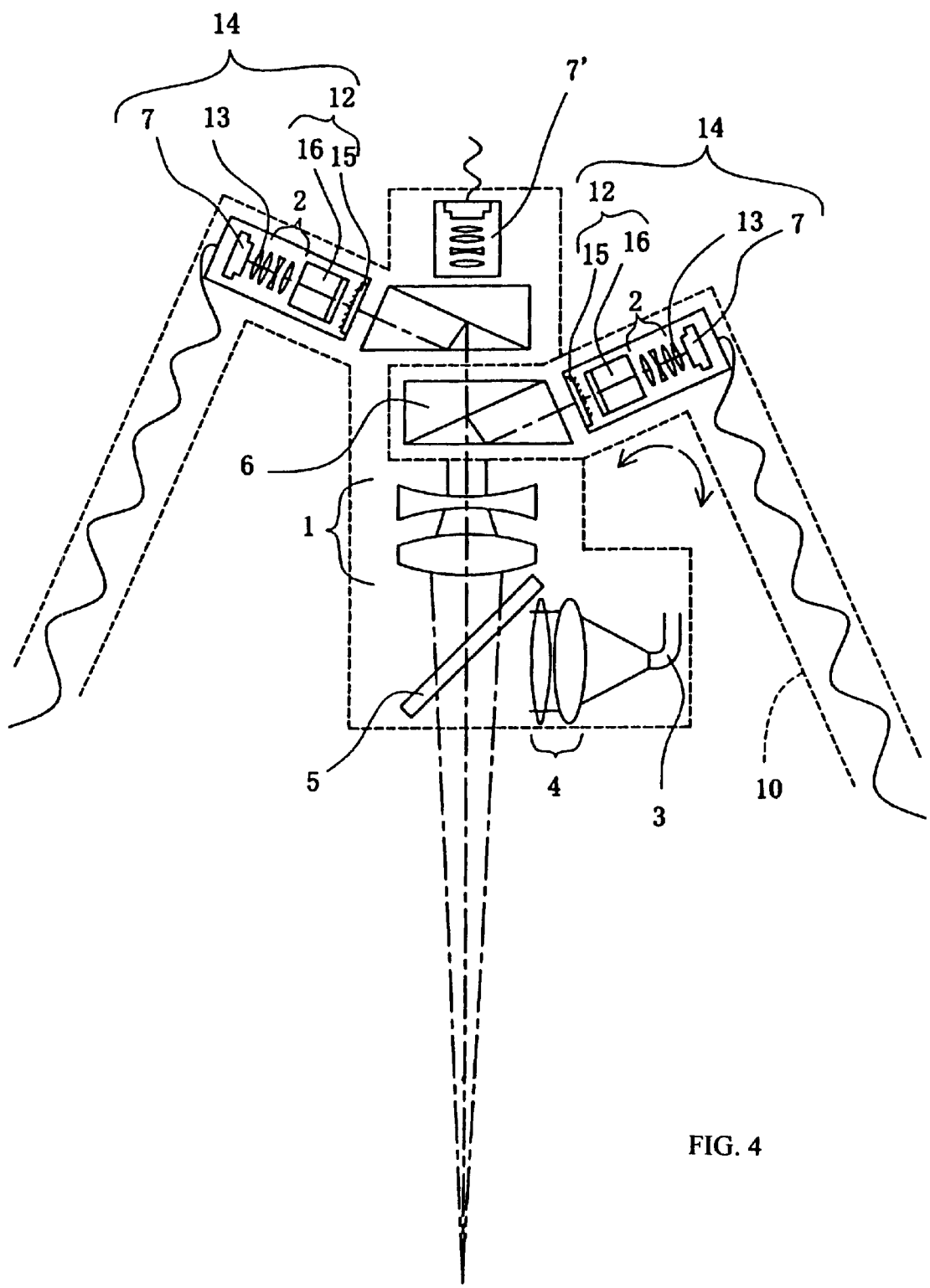
FIG. 4 is a side, sectional view of a main portion of the surgical microscope of Embodiment 3.
Figure 5:
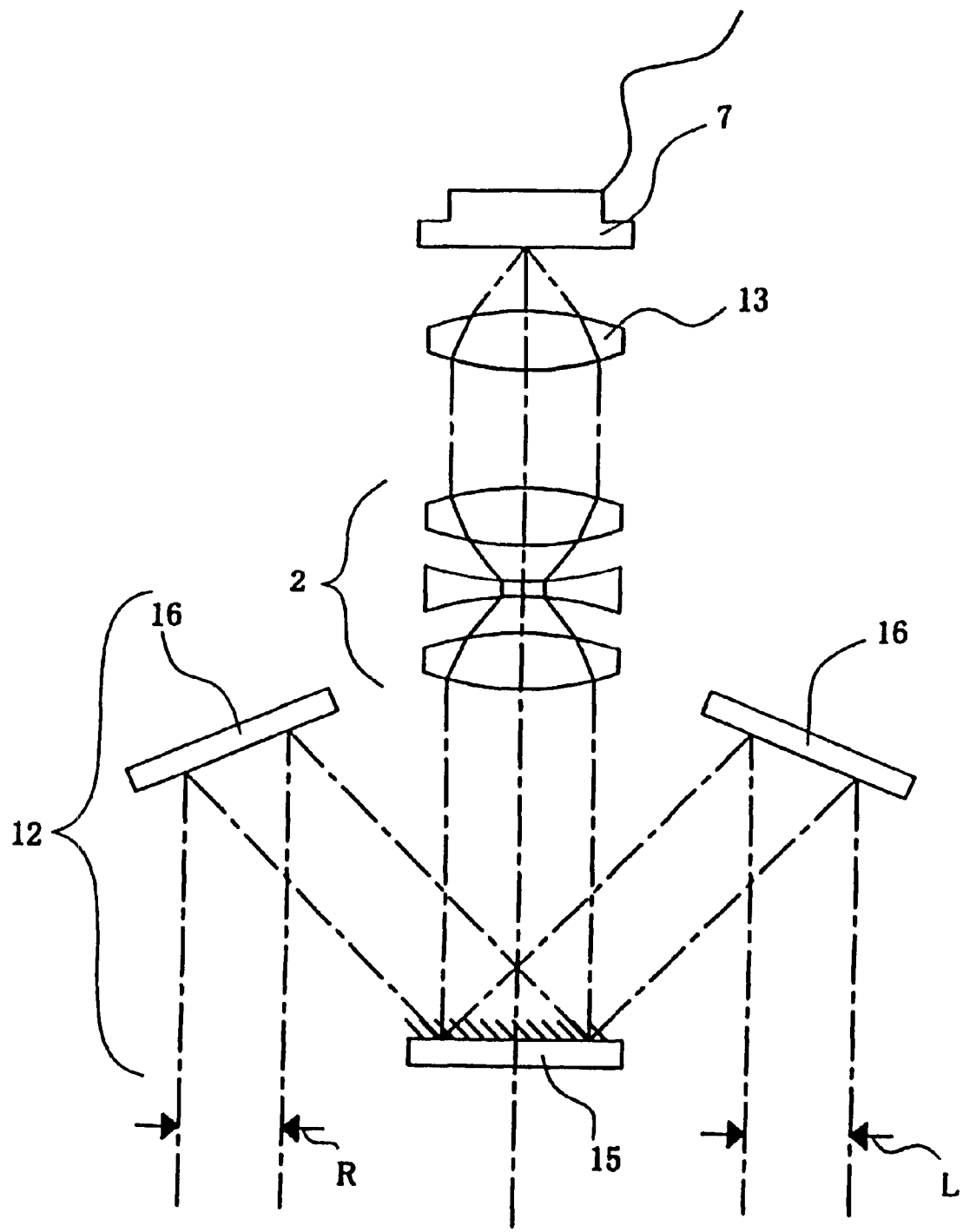
FIG. 5 shows, in greater detail and from a different perspective, the optical system of an image detecting unit that is used in Embodiment 3.

FIG. 4 is a side, sectional view of a main portion of the surgical microscope of Embodiment 3 of the 3-D viewing system according to the present invention. This embodiment is a modified version of Embodiment 2 shown in FIG. 3. Once more, only the structure that is different from that discussed previously is illustrated. This embodiment comprises, in order from a viewed object: a half mirror 5, variable objective lenses 1, a beam splitter 6, image detecting units 14 (each with an optical coupling means 12 for coupling the optical paths from the left and right apertures in a time-division manner), an optical zoom system 2, an optical imaging system 13, an image detecting device 7 (integrally mounted), and two display panels for the left and right eyes (not shown). As in FIG. 1, a common objective system 1 and an image detecting device 7' are provided. As before, the beam splitter 6 for the right viewer is integrally fixed to the arm together with the display panels (not shown) of image detecting unit 14. The beam splitter 6 is mounted on the microscope body so as to be rotatable around the optical axis of the variable objective lenses 1. However, this embodiment is provided with a DMD array 5 and two, left and right, mirrors 16 which, as will be described in detail below with reference to FIG. 5, are used with a DMD array 15 for coupling the optical paths from the left and right mirrors 16 (which here serve as left and right apertures) in a time-division manner. The micro mirrors of the DMD are controlled in unison by an external voltage source to change their inclination angles between two positions at a high frequency. Thus, the DMD array 15 here serves as a fast optical path switching means. FIG. 5 is a schematic diagram showing the configuration of the optical elements in the image detecting unit 14 according to this embodiment.

In the image detecting unit 14, the light flux from the beam splitter 6 is reflected by left and right mirrors 16, 16 onto DMD 15, which acts as a switch to selectively reflect either the light from the left mirror 16 or the right mirror 16 to the image detecting device 7 via the optical zoom system 2 and, optical imaging system 13. The micro mirror angles are changed according to the plus or minus phase of an alternating current power source (not illustrated) that drives the DMD array in synchonism with activating the image detecting device 7 to output a detected image. In this way, the light from one of the left and right light mirrors 16 is alternately guided to the image detecting device 7 and output to electronic displays (not illustrated in FIG. 4).

The main operator and the assistant are each provided with an image detecting unit 14 as shown in FIG. 5. The detected left and right images, which are detected in a time-division manner by the image detecting device 7, are displayed on the left and right display panels by synchronizing the display panel inputs with the left and right images that are sequentially output by the image detecting device 7. The frequency of the A–C current driving the DMD array and the image detecting device 7 is preferably such that at least 30 images per second are detected by the image detecting device 7. In a known manner, this enables each display to display images so that image flicker is not bothersome. The DMD 15 and image detecting device 7 can be driven at a much higher frequency than described above, in which case the viewer will never perceive any image flicker. With this embodiment, as is shown in Embodiment 1, a main operator and an assistant can view images correlated to their own positions without changing the microscope body when they move positions. In addition, the operators can change their viewing postures and the images that are viewed by each will be correlated to their new viewing postures automatically. Thus, visual confusion is minimized. Furthermore, with this embodiment, the left and right co-focus, magnification, and focus adjustments are easier because only a single optical zoom system is necessary for each operator. The size and cost are reduced as compared to prior art devices because only one imaging system 13 and one optical zoom system 2 are necessary for each operator. Cross talk between images intended for the left and right eyes does not occur because the left and right images having different parallaxes are displayed on separate monitors for the left and right eyes.

Embodiment 4

Figure 6:
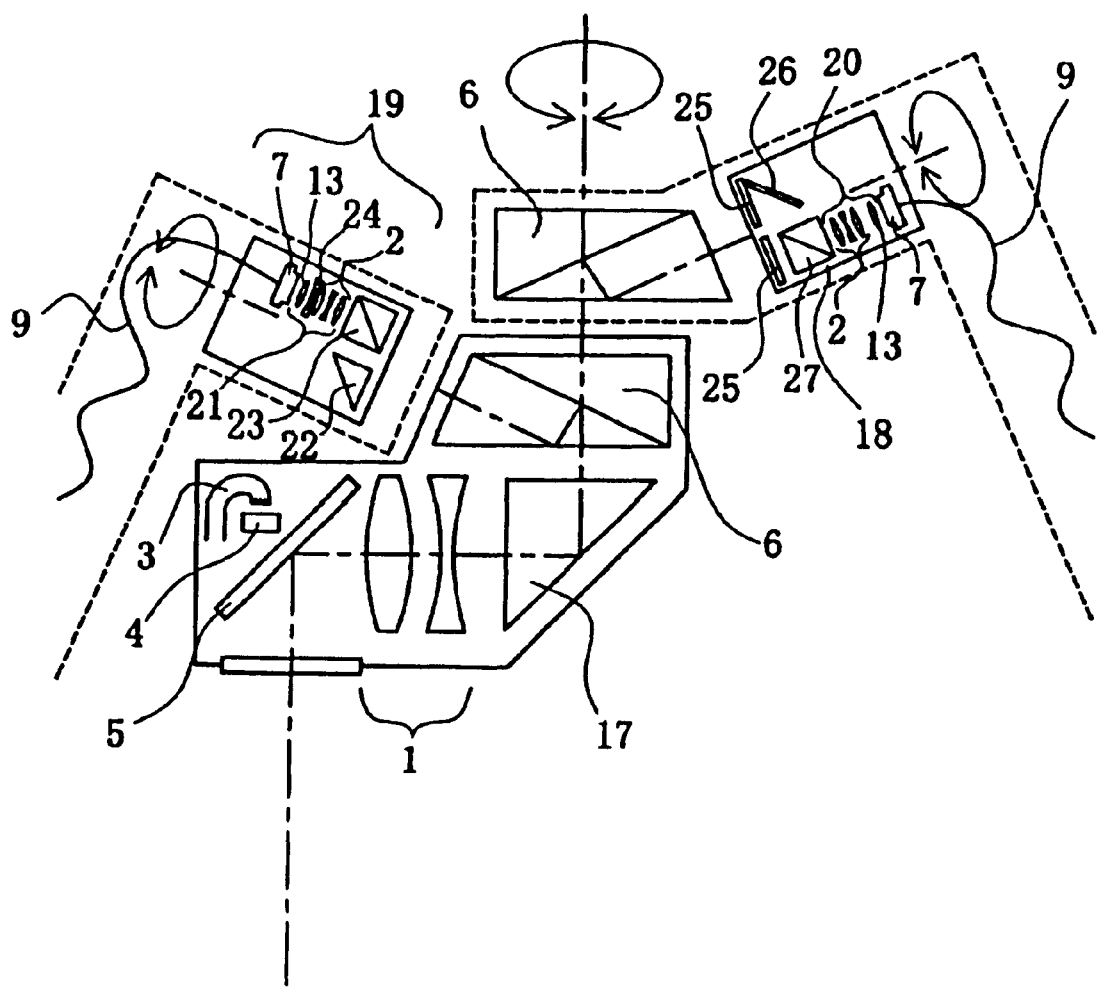
FIG. 6 is a side, sectional view of a main portion of the surgical microscope of Embodiment 4.

FIG. 6 is a side, sectional view of the main portion of the surgical microscope of Embodiment 4 of the 3-D viewing system according to the present invention. This embodiment is a modified version of Embodiment 3, and comprises, in the order from the viewed object: a half mirror 5, variable objective lenses 1, an optical reflective member (e.g., a right-angle prism) 17, lower and upper optical beam splitters 6, 6, and lower and upper image detecting units 19, 18 on the divided optical paths for the operator and assistant. In this figure, the upper beam splitter 6 and image detecting unit 18 to the right are integrally mounted to the right microscope arm and rotate around the optical axis of the optical viewing system of the microscope body. Each of the image detecting units 18, 19 is rotated around the optical axis of the beam splitters 6, 6. The image detecting devices 7 in each of the image detecting units 18, 19 are connected to two, left and right, display panels through a cable 9 and the images which are detected by the image detecting device are displayed on the display panels. In this figure, the left and right display panels (not shown), the image detecting unit 18, and the upper beam splitter 6 are integral to the right arm and thus are rotated with it around the optical axis of reflected light from the optical reflective member 17. Thus, when the operator rotates the right arm to a new position, since the upper beam splitter 6 as well as the left and right apertures are integral to the right arm, the upper beam splitter 6 and left and right apertures are accordingly rotated, allowing the operator to view properly oriented left and right images at the new position.

As before, when the display panels (not shown in this figure), are tilted, the image detecting units 18, 19 can be rotated around the optical axis of light beams that are reflected by the beam splitter 6 in order to properly orient the displayed image to the orientation of the display panels. A mechanical or electrical clutch can be used to engage or release a linkage between the movements of the display panel and the image detecting unit. In the imaging units 18, 19, respective optical imaging systems 20, 21 for changing magnification are provided, as well as respective image detecting devices 7. The left imaging unit 19 modulates and merges the light from the left and right apertures as four polarized components after they pass a reflective prism 22 and polarized beam splitter 23 to direct them into the optical imaging system 21 for changing magnification. In the optical imaging system 21 for changing magnification, a twisted nematic liquid crystal cell 24 is provided in order to rotate the polarized light direction by 90°. This angle is switched between 0° and 90° by a control means (not shown) using an electric voltage from an external source. If the liquid crystal cell 24 is a ferro electric liquid crystal cell, it can be driven at a higher speed. The imaging unit 19 can thus detect the left and right images in a time-division manner by driving the liquid crystal cell 24 from the external source synchronously with outputs from the image detecting device 7.

As illustrated in FIG. 6, the right imaging unit 18 has a different configuration from the left imaging unit 19. In the imaging unit 18, shutter devices 25, 25 are provided on the optical paths from the left and right apertures. The shutter devices are controlled by a controller (not shown) so as to be repeatedly switched between a transmission verses a blocking (i.e., shading) state so that either one of the left and right images is guided into a common optical system 20 without being mixed. The shutter devices 25, 25 are synchronized with the image detecting device 7 so that the image detecting device 7 transmits the left and right images in an alternate manner. A reflective mirror 26 is positioned on one of the optical paths from the left and right shutter devices 25, 25 and a beam splitter 27 (which here serves as a beam combiner) is positioned on the other optical path. In this way; the left and right light fluxes are guided into one and the same optical path. In this figure, the operator and assistant have an optical system with different configurations in their imaging units. This is merely for the purpose of explanation of multiple structures that may be selected. As will be apparent to those of ordinary skill in the art, both the operator and the assistant may instead be provided with imaging units having the same configuration. With this Embodiment, just as with Embodiment 1, the operators (a main operator and an assistant) can view respective images as is seen from their own position without changing the microscope body when they move to the opposite position or to the side position. In addition, the operators can change their viewpoint to the object without creating confusion as to what they are viewing because the images that are displayed properly coincide in orientation with the images as seen from the new viewpoint.

Furthermore, with this embodiment, as is in Embodiment 3, the left and right co-focus, magnification, and focus adjustments are easier because an optical zoom system is provided for each operator. However, the size and cost are reduced because only one imaging device and one optical zoom system are needed for each operator. Cross talk does not occur between the left and right images because these images are switched in a time-division manner.

Embodiment 5

FIG. 7 is a schematic diagram illustrating Embodiment 5 of the 3-D viewing system according to the present invention. This embodiment provides a modified version of the imaging units. The imaging units of this embodiment include wavelength selective devices 29, 29' provided at the left and right apertures, which vary the wavelength of the light that is transmitted in a time-division manner among three time periods. Thus, the color components which pass the left and right optical paths via wavelength selective devices 29, 29' are subject to repeated change from blue B, to green G, to red R, and back to blue B in a repeating sequence while they go through the devices 29, 29'. The wavelength selective devices may be made in many ways apparent to those of ordinary skill in the art, the easiest solution being using three different color transmitting filters mounted in a rotating disk. The detected image signals from the image detecting device 7 are stored on the memory 30.

FIGS. 8A and 8B are diagrams showing that the devices 29, 29', respectively, have different transmittances at a given point in time. The transmittance of the devices 29 and 29' is changed in a repeating time sequence, as indicated by the arrows, during the time periods (1), (2) and (3) so that the viewer sees a 3-D view. For instance, during time period (1) the wavelength transmitted by the wavelength selective device 29 is the color B and the wavelength transmitted by the wavelength selective device 29' is the color G. As a result, the light rays passing along the left and right optical path via the devices 29, 29' differ from each other in color during each of the time periods (1), (2), and (3), as illustrated.

The imaging unit 28 of this embodiment merges the light fluxes from the left and right optical paths via a reflective prism 22 and a beam splitter 27 after they have passed the devices 29, 29'. The merged light flux is then imaged onto the image detecting device 7 via the optical zoom system 2 and optical imaging system 13. The image detecting device 7 may be formed of a color (R, G, B) CCD array or other known device that captures color images. With the imaging unit of this embodiment as described above, the merged left and right images which have been captured by the image detecting device 7 are reconstructed for each color so as to obtain left and right display images in full color, as is known in the art. Thus, both left and right images can be displayed at once, rather than in a time-division manner as in the Embodiment above.

Embodiment 6

Figure 9:
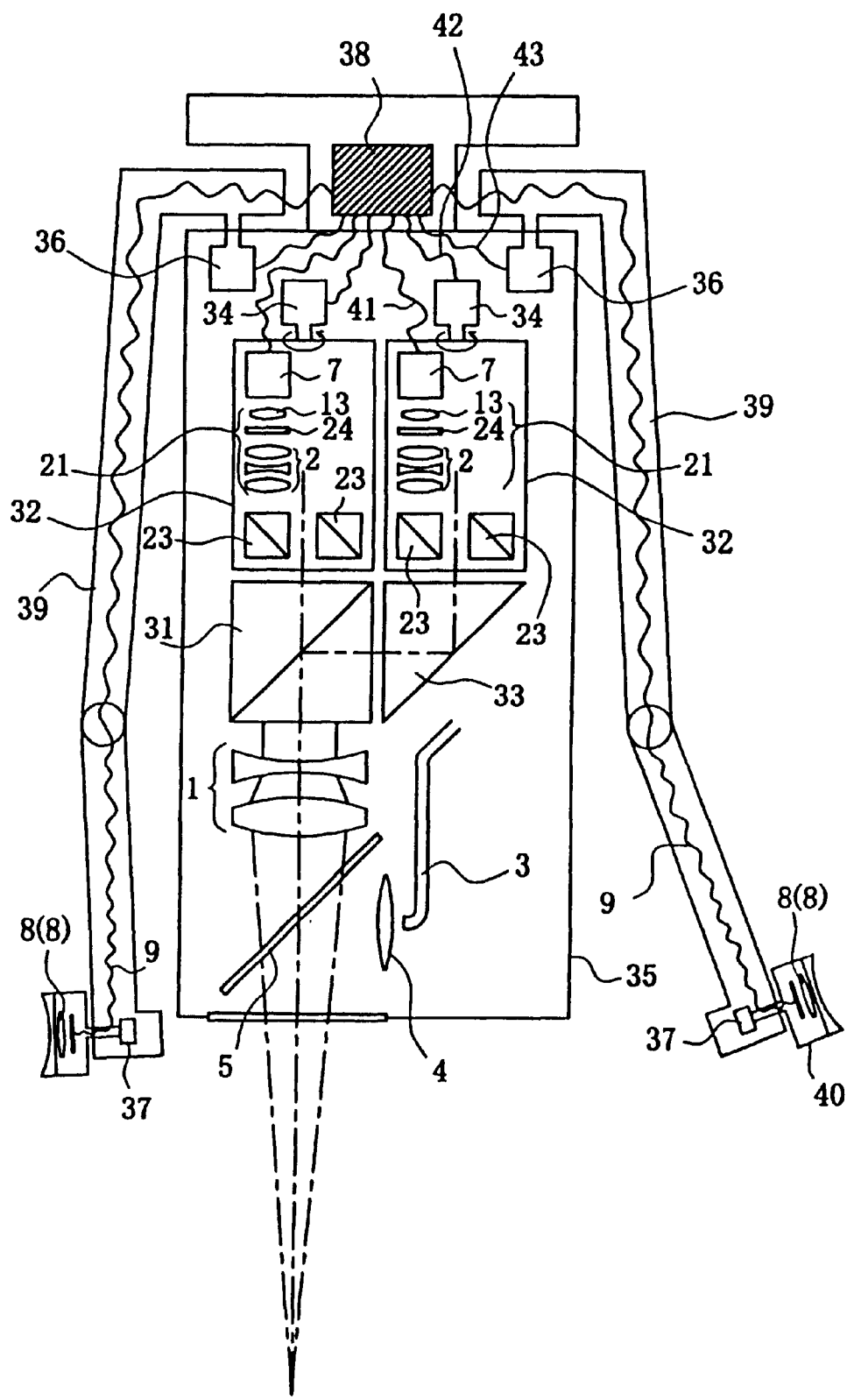
FIG. 9 is a side, sectional view of the entire surgical microscope of Embodiment 6.

FIG. 9 is a side, sectional view of the entire surgical microscope of Embodiment 6 of the 3-D viewing system according to the present invention. In this Embodiment, a beam splitter 31 is positioned behind variable objective lenses 1. An image detecting unit 32 is positioned on each of the transmission path (left) and reflective path (right). Optical reflective system 33 is positioned on the reflective path of the beam splitter 31. In each image detecting unit 32, a polarized beam splitter 23 is positioned in each of the left and right image optical paths. The polarized beam splitters are used in order to modulate the light fluxes on the left and right optical paths as two linearly polarized light beams which share a common optical path. The right polarized beam splitter 23 in each image detecting unit 32 can be replaced by a reflective member (for instance, a reflective mirror, reflective prism, or beam splitter) which deflects the optical path to the left polarized beam splitter 23. In each image detecting unit 32, an optical zoom system 2 and an optical imaging system 13 are positioned as components of the common optical system 21 and are used to adjust the magnification and for imaging, respectively. In the common optical systems 21, a respective polarized liquid crystal cell 24 is mounted and is controlled using an external voltage source to chronologically switch its polarized direction between 0° and 90°. Each image detecting device 7 is positioned on the optical path from the common optical system 21. The image detecting device 7 is synchronized with the switching of the polarization direction of the polarized liquid crystal cell 24 in order to capture the left and right images in a time-division manner. The resulting signals are then demultiplexed and displayed on the left and right display panels. In the figure, only one of the left and right display panels for each operator is visible in this side view. The other left and right display panels are obscured, because they are located behind the plane of the figure. In this embodiment, rotation motors 34, 34 having encoders for encoding the rotation of the respective image detecting units 32, 32 are provided for each image detecting unit 32,32. One end of the arms 39, 39 for the main operator and assistant, respectively, is rotationally connected to the microscope body 35 through a respective encoder 36 for detecting the rotational position of the display panels 8(8) in relation to the microscope body. A display unit 40 having left and right display panels 8(8) is rotationally connected to the other end of the arm 39 by its lower part through the respective encoder 37 for detecting the inclination of the display panels 8(8) in relation to the lengthwise direction of the arm.

The microscope body 35 is provided with a controller 38 which is connected to the image detecting devices 7,7, rotation motors 34, 34 with encoders 36, 36, 37, 37 through the cables 41, 41, 42, 42, 43, 43, 9, 9, respectively. When the operator (viewer) rotates the arm 39 in relation to the microscope body 35 to change the position of the left and right display panels, the encoder 36 detects the position and signals to the controller 38 through the cable 43. When the display unit 40 having the display panels 8, 8 is rotated in relation to the arm 39 to incline the left and right display panels, the encoder 37 detects the inclined angle and signals to the controller 38 through the cable 9. Then, the controller 38 calculates the rotation of the rotation motor 34 with encoders based on the rotation direction and angle of the left and right display panels and rotates the image detecting unit 32 in response thereto using the rotation motor 34. The image detecting device 7 in the image detecting unit 32 alternately detects the left and right images at the rotated position and sends the image data to the controller 38 through the cable 41. The controller 38 sends the image data to the display panels 38 through the cable 9 and the display panels 8 display this data as images. In this way, when the operator changes the rotational angle or display panel inclination in relation to the microscope body, the data on the rotation and/or inclination is sent to the controller in a real-time manner. The controller then directs the motors for the image detecting units to capture images corresponding to the position. Therefore, images having viewpoints which correspond to those of the operator are obtained. With this embodiment, as in Embodiment 1, the operators (a main operator and an assistant) can obtain images as seen from their own position without changing the microscope body when they move to the opposite position or the side position. In addition, by detecting the viewing position of the operator, by changing the direction of the image detecting unit, and by appropriately linking the viewing position and the direction of the image detecting unit, an operator can view images that are oriented properly for his position automatically.

Embodiment 7

Figure 10:
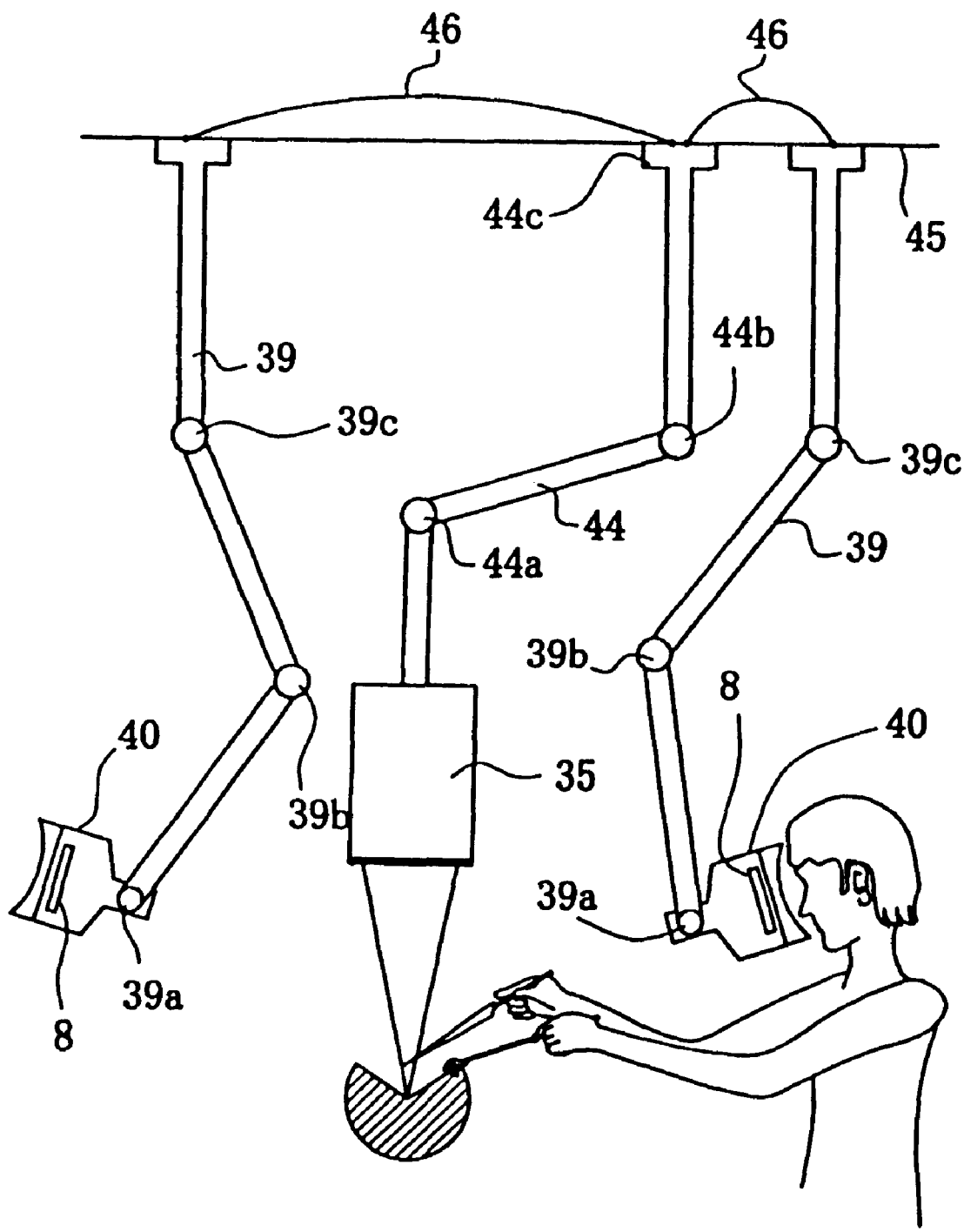
FIG. 10 is a side, elevation view of the entire surgical microscope of Embodiment 7.

FIG. 10 is a side elevation view of the entire surgical microscope of Embodiment 7 of the 3-D viewing system according to the present invention. In this Embodiment, unlike Embodiment 6, the display panels are provided separately from the microscope body. For instance, as illustrated, they may be independently hung from the ceiling. The microscope body 35 includes structure as was illustrated for Embodiment 6 (FIG. 9) but, for clarity of illustration, is not repeated in FIG. 10, such as the variable objective lenses, beam splitter, optical reflective system, and two image detecting units for two viewers. Just as before, the two viewers can view from positions that vary in location about the optical axis of the microscope body 35. The rotational directions of those two image detecting units are controlled independently and externally through a controller (not shown) provided in the microscope body 35. As is shown in FIG. 10, the microscope body 35 is suspended from a ceiling 45 through an arm 44. The joints 44a, 44b of the arm 44 which support the microscope body 35 are each provided with an encoder (not shown).

The encoders detect the position (inclination, location, height, and so on) of the microscope body 35 and signal the position to a controller (not shown) in the microscope body 35. A display unit 40 for each operator is suspended from the ceiling 45 through an arm 39. The joints 39a, 39b, 39c of the arm 39 which support the display unit are provided with encoders (not shown). Those encoders detect the position (inclination, location, height, and so on) of the display panels 8,8 mounted in the display unit 40 and signal a controller (not shown) in the microscope body 35 through the cable 46. The controller within the microscope body 35 computes, using the data from the encoders in the joints of the arms 44 and 39 which support the microscope body 35 and the data from the encoders in the arms which support the display panel holding member 40, the direction from a particular display panel to the object being viewed by the microscope. The proper orientation of the image detecting unit is then determined and corrected in a real-time manner. The image detecting units can be driven independently for the operator and assistant. Therefore, two operators can view at their desired positions while having the images they each see on the electronic displays automatically corrected to the proper orientation. Instead of being supported from the ceiling, the display units 40 can be supported from other structures, such as a wall, the floor, or an operating table. The other components of this embodiment are the same as in Embodiment 6 (shown in FIG. 9).

Embodiment 8

Figure 11:
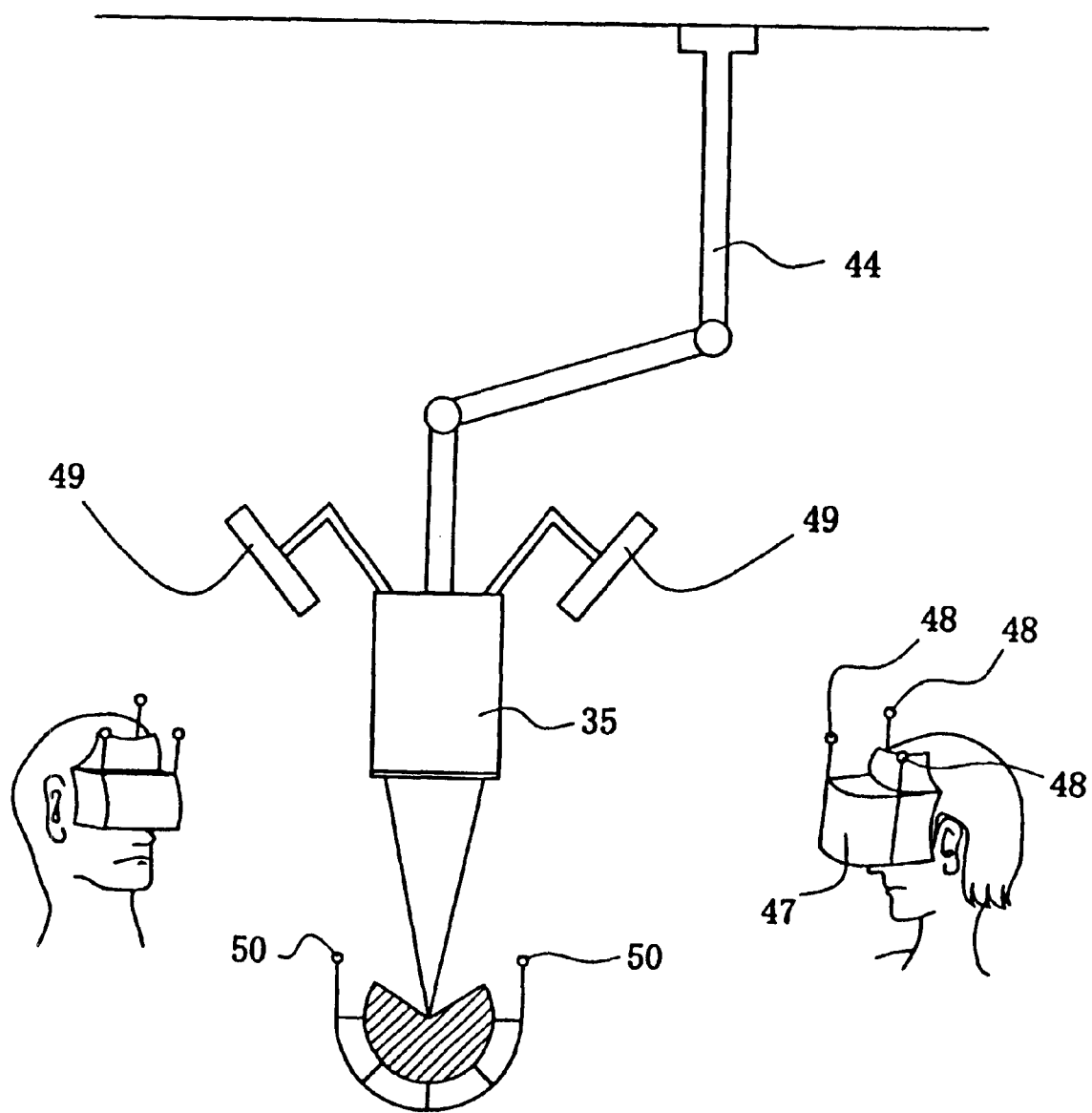
FIG. 11 is a side, elevation view of the entire surgical microscope of Embodiment 8.

FIG. 11 is a side elevation view of the entire surgical microscope of Embodiment 8 of the 3-D viewing system according to the present invention. This embodiment is a modified version of Embodiment 7. For clarity, many items are omitted, in that they do not differ from that of Embodiments 6 and 7. For example, the microscope body 35 includes, as was illustrated for Embodiment 6 shown in FIG. 9: variable objective lenses, a beam splitter, an optical reflective system, and two image detecting units for two viewers that can be rotated around the optical axis of the microscope body 35 (not shown in FIG. 11). In Embodiment 8, the display units 47 are separate from the microscope body and are worn by the operators. With this type of display unit, the operator is free to move about because the display units are entirely independent from the microscope body 35. In addition, the arms which connect the display panels to the microscope are eliminated, providing more open space. Further, in this embodiment, the means for detecting the operator viewing position and orientation consists of, instead of encoders, three light emitting elements 48, 48, 48 fixed on the display unit 47 and navigation units 49, 49 which are mounted on the microscope body 35 to monitor the position of the light emitting elements using a television camera. The navigation unit 49 is programmed to detect the operator's viewing position and head orientation by monitoring the location of the light emitting elements 48, 48, 48 using a television camera. Furthermore, if light emitting elements 50, 50 are provided around the viewed object and monitored by a television camera, the location of the microscope body 35 can also be also detected. A similar navigation system is disclosed in U.S. Pat. No. 6,081,367, the disclosure of which is incorporated herein by reference. As another navigation system, reflective balls to reflect light can be used in lieu of using the light emitting elements. Infrared rays are emitted from the microscope body 35 to the display unit 47 and the location of the reflective balls which reflect the infrared rays are monitored by two television cameras so as to detect the operator's viewing position. In this way, the same effect is obtained as is described above for the two preceding embodiments.

Using the navigation unit 49, the angular positions of the head-mounted display surfaces relative to the microscope body 35 are monitored. Based on the angular positions obtained, the image detecting unit can be controlled by being rotated through a driving member, such as a motor mounted in the microscope body 35, so that the two separated images that are detected have a parallax orientation that corresponds to that of the head-mounted display surfaces. In this way, even if the display units are not held on the microscope body or an arm as in Embodiment 1, the operators (main operator and assistant) can obtain images appropriate to their own position using a single microscope body without changing the microscope settings. With the benefit of having a means for detecting each operator's angular position relative to the microscope body, and a means for changing the angular position of the image detecting unit in response to that operator's angular position, each operator (i.e., a main operator and an assistant) can view images that are automatically oriented properly for the viewer's position.

Embodiment 9

Figure 12:
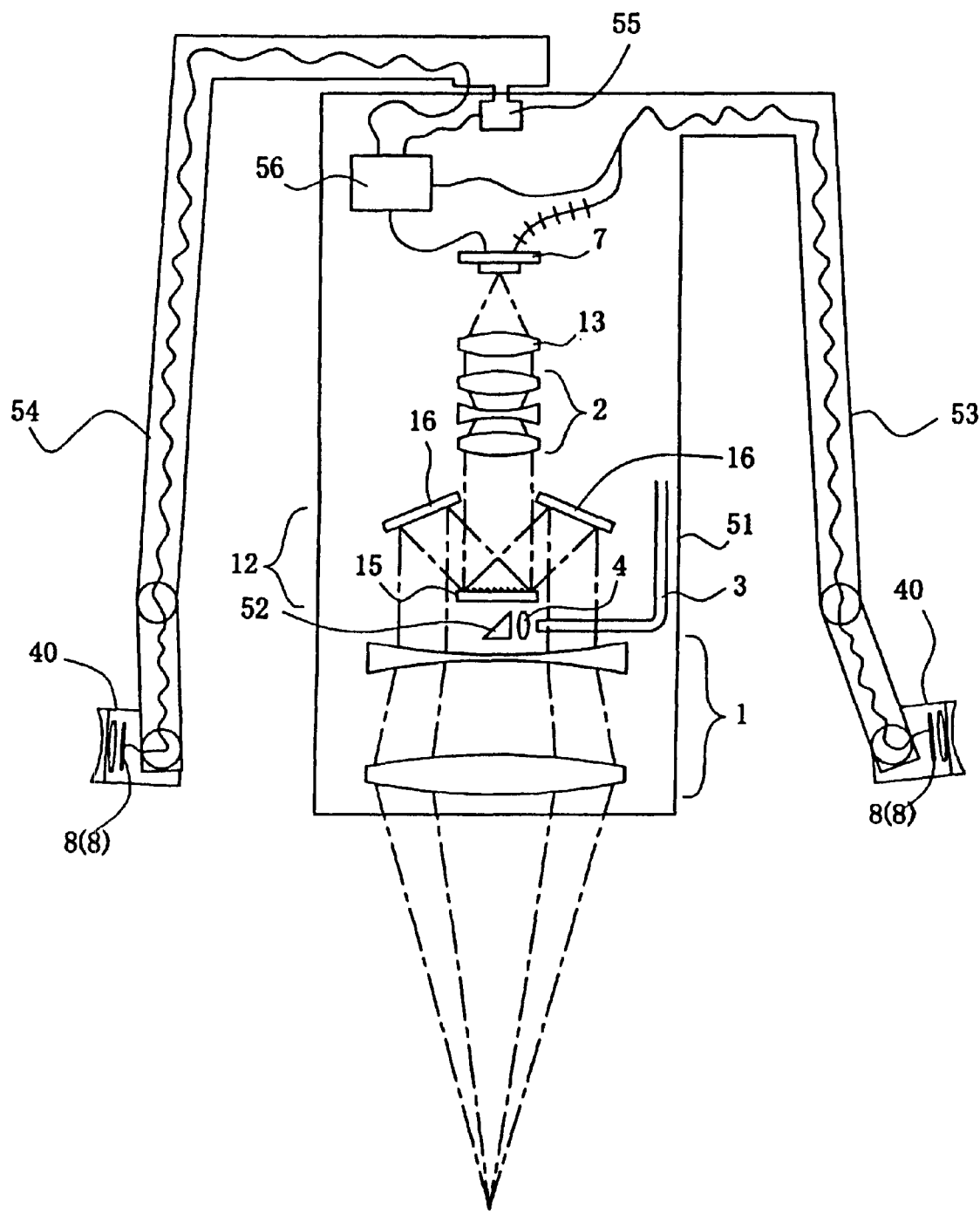
FIG. 12 is a side, sectional view of the entire surgical microscope of Embodiment 9.

FIG. 12 is a side-sectional view of the entire surgical microscope of Embodiment 9 of the 3-D viewing system according to the present invention. In this Embodiment, two optical systems are actually included within the microscope body 51; however, for clarity of illustration, only the optical system nearest the reader is illustrated. Each optical system includes an optical zoom system 2, an imaging lens 13, and an image detecting device 7. These are positioned sequentially on the optical path of the light flux that has been merged by the optical path merging means 12. Light fluxes from the optical path merging means 12 are imaged onto the image detecting device 7 via the optical zoom system 2 and imaging lens 13. Each optical system also includes variable objective lenses 1, as well as an illumination system formed of a light guide 3, an illumination lens 4, and a prism 52. Two apertures, one for the light that will form the image directed to the left eye, and one for the light that will form the image directed to the right eye, are provided for each optical system. Thus, in all, the microscope body 51 contains four apertures that pass light from the object to the two image detecting devices 7. The optical path merging means 12 consists of a DMD 15 and two mirrors 16,16 that are positioned on the object side of the optical zoom system 2. The optical path merging means 12 guides alternate, left and right images having different parallaxes to the optical zoom system 2 in a time-division manner. Thus, the two optical systems allow four images having different parallaxes to be imaged using two image detecting devices 7,7. In this embodiment, two mirrors 16, 16 for each optical system are fixed in position so that, using the two optical systems, two assistants can view images at predetermined viewing positions that are at 90° or 180° to the direction in which the main operator looks to view the operation. However, no images at positions intermediate to these positions are available. However, this embodiment provides a significant improvement to that of the prior art devices, in that two viewing positions relative to the viewing position of the operator are provided, namely, opposite the operator or at the side of the operator, without changing or adjusting the microscope body. In FIG. 12 the arm 53, which holds the display unit 40 having the display panels 8(8) for the operator (i.e., the arm on the right side of the figure), is fixed to the microscope body 51. Thus, the right display panels 8, 8 are at the fixed location in relation to the axis of the microscope body.

Figure 13A:
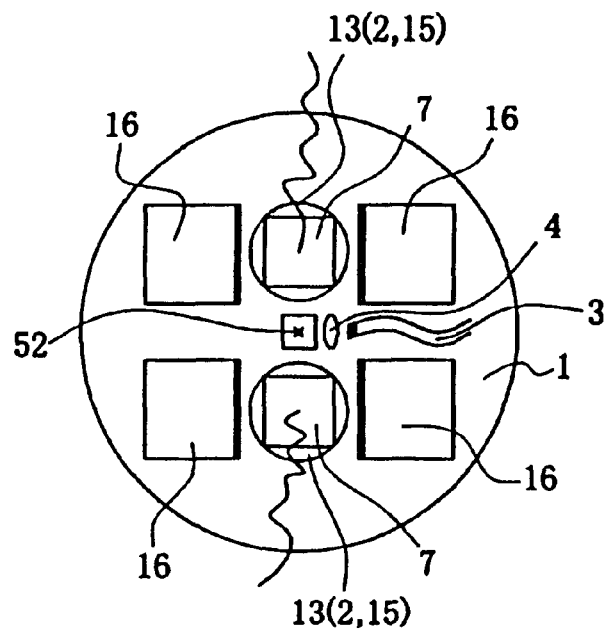
FIGS. 13A and 13B show the relationship between the display panels and the images displayed in the surgical microscope shown in FIG. 12, with FIG. 13A being a top view of the surgical microscope shown in FIG. 12 and FIG. 13B illustrating the relationship between the display panels and the images displayed in the surgical microscope shown in FIG. 12.

FIG. 13A is a schematic diagram of the components of the microscope body of this embodiment as viewed from above, with the illustrated components having the same reference numerals as those shown in FIG. 12. Thus, a separate description of these components will be omitted.

Figure 13B:
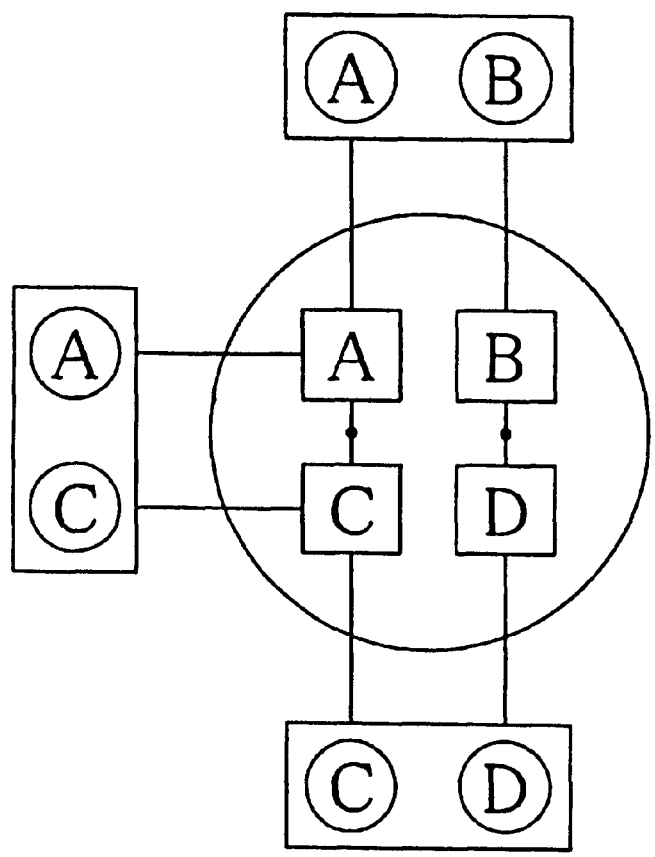

FIG. 13B is an illustrative diagram of the cylindrical microscope body (item 51 of FIG. 12) as seen from above. For ease of description, the circle in FIG. 13B representing the microscope body as seen in cross-section will be momentarily considered as representing instead the face of a clock. Thus, the display unit (represented by a rectangle) positioned at the top of the figure will be termed the display at the 12 o'clock position. Similarly, the display unit represented by the rectangle to the left in the figure will be termed the display unit at the 9 o'clock position, and the display unit represented by the rectangle at the bottom of the figure will be termed the display at the 6 o'clock position.

Within the circular area of the microscope body, FIG. 13B accurately relates the positions of the four mirrors 16 shown in FIG. 13A (each mirror receiving light flux having different parallax due to the differing positions of the four mirrors 16), to the light fluxes A, B, C, D shown within the circular microscope body illustrated in FIG. 13B. This can be verified by noting the one-to-one correspondence between the four positions of the mirrors 16 in FIG. 13A within the circular microscope body and between the four positions of the light fluxes A, B, C, D within the circular microscope body shown in FIG. 13B. However, in the event the light fluxes A, B, C, D are detected using image detecting devices that are oriented with "up" facing the 12 o'clock position, it is apparent that the direct outputs of the pairs of image detecting devices will yield left and right images having proper "up" orientation only in the case of detecting the light fluxes C and D, which light flux images are displayed on monitors C and D located at the 6 o'clock position.

If data from the image detecting devices that detect light fluxes A and C is fed to a display unit positioned at the 9 o'clock position or if data from the image detecting devices that detect light fluxes A and B is fed to a display unit positioned at the 12 o'clock position as illustrated in FIG. 13B, the display images at the 9 o'clock and 12 o'clock positions would be oriented improperly. Thus, it is apparent that these display images need to be reoriented in rotation relative to the detected light fluxes in order to yield a proper view of the scene for a person standing or sitting and facing the display units.

Thus, the display images at the 9 o'clock position need to be rotated clockwise 90 degrees and the display images at the 12 o'clock position need to be rotated 180 degrees in order to present a proper orientation of the operation being viewed. Of course, all the image-detecting units need not be aligned in a single direction. In fact, the most desirable arrangement, in terms of reducing the number of display images that need to be rotated, is to have the "up" direction of the image detecting devices that detect light fluxes A and B be reversed to that discussed above. In this case, only the images for the display unit at the 9 o'clock position need to be rotated, but in this case the rotation direction is no longer 90 degrees clockwise for both display images, as discussed above. Rather the left display image needs instead to be rotated 90 counter-clockwise.

In this manner, display images having the proper orientation and parallax for the position from which they are viewed are automatically obtained for the present embodiment as follows. The arm 54 (FIG. 12) which provides support for the display panels 8, 8 for the operator on the left side of FIG. 12 is coupled to the microscope body 51 through rotational encoder 55. The rotational encoder 55 detects the permissible rotational positions for this embodiment (0°, −90° or +90°) of the arm 54 relative to the microscope body 51 and signals the detected position to a controller 56. If a rotational position (0°) of the arm 54 is detected, indicating that the assistant is positioned at the 6 o'clock position of FIG. 13B with the arm 54 (FIG. 12) directly opposite the operator (fixed arm 53 as illustrated in FIG. 12), the controller 56 sends the image information to the display panels 8, 8 so as to display the images as shown in bottom part of FIG. 13B (i.e., the left and right images are derived directly from image detectors C, D, respectively).

On the other hand, if a rotational position (−90°) is detected, the controller 56 sends the image information to the display panels 8,8 shown at the 9 o'clock position in FIG. 13B, using image detectors A, C. In order to obtain proper orientation of the images for this observation site, the images A, C are first stored to a memory (not shown) and the detected data is read out so that the images A, C, are rotated 90° so as to display a properly oriented image, as discussed above. The controller 56 also sends the image information to the display panels 8, 8 located at the 12 o'clock position (i.e., the stationary position of arm 53 (FIG. 12). Thus, the controller serves to select the image information to be sent to the left and right display panels and to control the rotation angle and direction of the images to be sent to the left display panels in order to provide images having different, left and right parallaxes, and with the proper orientation. In this embodiment, two sets of time-division multiplexing optical systems, each formed of a DMD array, a mirror, and having a zoom capability, are provided. The captured images are selected and, if necessary, properly rotated before being displayed in accordance with signals which are sent by the means for detecting the position of the display panels. Thus, an assistant and an operator can obtain 3-D images displayed with proper orientation at his position using a single microscope body, and proper images for a different position can be obtained automatically when the assistant moves to the opposed position or to a side position. Furthermore, cross talk does not occur between the two displayed images because they are displayed in a time-division manner.

If an optical path merging system consisting of a DMD array and a mirror is provided in addition to the two sets of optical path merging systems 12,12 to merge the optical paths for a main operator and an assistant, it is possible that light fluxes including four different parallaxes are passed through a single optical zoom system in a time-division manner. Controllers can be used to store the images, select the desired images, and adjust the orientation of the images, if needed, so that they are displayed with proper orientation on the display panels.

Embodiments 10 to 14, to be discussed in detail later, involve modifications which relate to various types of display panels. In Embodiments 10 to 14, a large aperture lens is used which conveys left and right images having different parallax to the left and right eyes, respectively, of the user. In Embodiment 10 (FIG. 14) a single display panel is used in lieu of separate display panels, as described above. However, prior art display units of this type either do not provide sufficient eye relief, or, do not provide wide-angle views. Thus, wide-angle display units which are easy to view were not obtained. The reason for this is because either the eye relief is insufficient, or the left and right optical paths are mixed, resulting in cross-talk between images intended for the left and right eyes. In the prior art, the left and right images are displayed in a time-division manner on a display panel and the operator must wear a pair of polarized glasses in order to insure that the images intended for the left and right eyes, respectively, do not reach the other eye. However, wearing polarized glasses is cumbersome, and portions of the display may actually be obscured by the frames of the glasses. Embodiments 10 to 14 provide 3-D viewing for an operator and assistant(s) that yield wide-angle images and a large eye relief without need for wearing polarized glasses. In addition, the 3-D viewing system is compact and relatively inexpensive.

Embodiment 10

Figure 14:
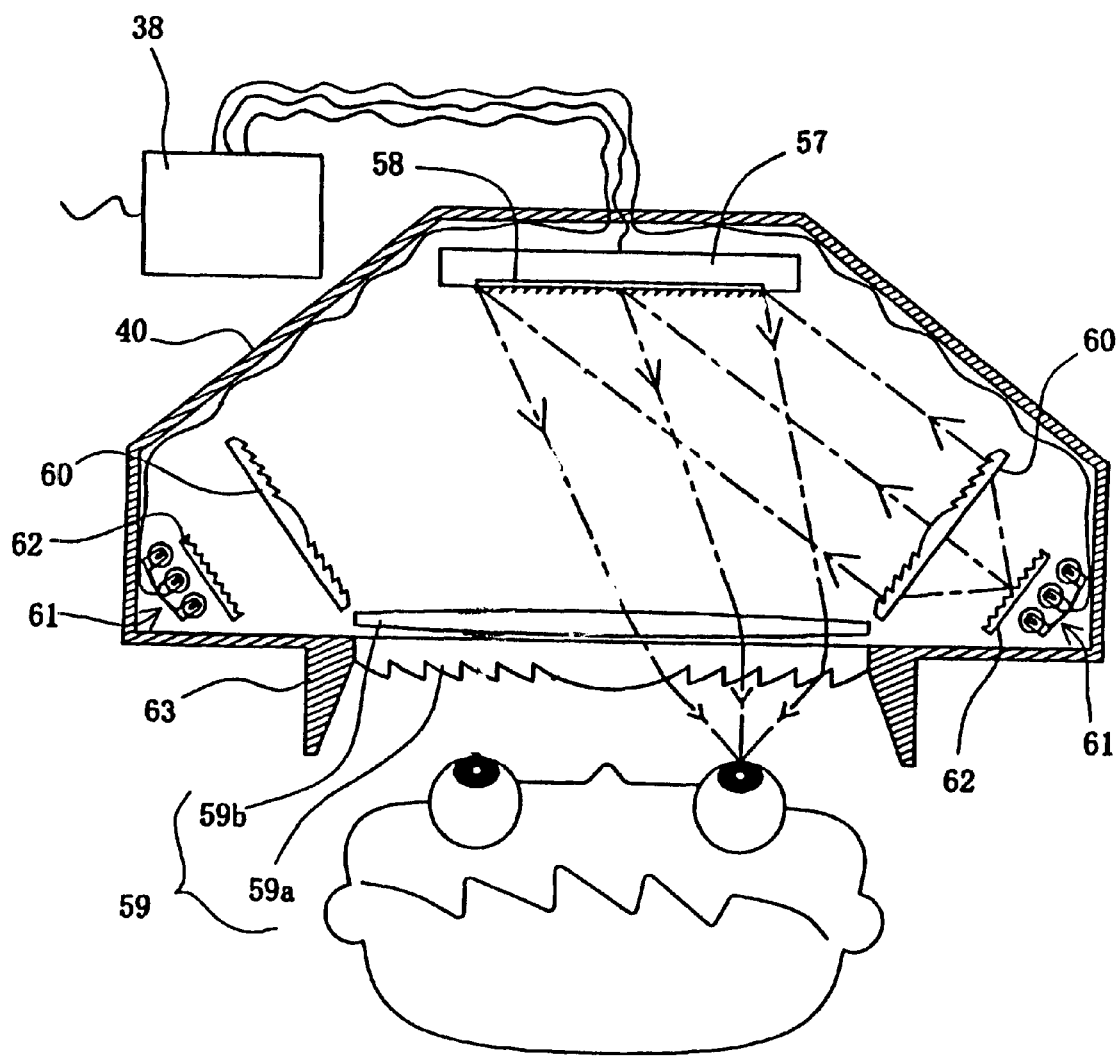
FIG. 14 is a horizontal cross-sectional view of the display panel of Embodiment 10.

FIG. 14 is a horizontal cross-sectional view of the display panel of Embodiment 10 of the 3-D viewing system according to the present invention. As mentioned above, this embodiment uses a single display panel 57 formed using a two-dimensional array of DMD's 58, with each individual micro mirror being controllable between two angular positions. One the two positions for each DMD reflects incident light rays, for a given light source, so as to be viewable by the observer. The other of the two positions reflects incident light rays, for a given light source, so as to not be viewable by the observer. On the DMD panel 57, the images for the left and right eyes are displayed alternately in a time-division manner using the output of an image detecting unit (not shown). In front of the DMD's 58, a large lens system 59 having a large aperture is positioned for magnifying the images. On the left and right sides of the large lens system 59 are provided: a focusing lens 60; blue B, green G, and red R light source LED's 61; and, in front of the LED's 61, a diffusion plate 62. All of these face toward the DMD panel 57. The DMD panel 57 operates as follows. The image intended for the right eye is displayed on the DMD panel 57 at a certain point in time, during which time the controller 38 turns on the LED's 61 for the right eye (for instance, the LED's 61 on the right side in the figure). The LED's 61 illuminate the entire display surface of the DMD panel 57 through the diffusion panel 62 and the focusing lens 60. The DMD's 58 are driven by the control signals from the controller 38 to reflect the incident illumination light received via the focusing lens 60 toward the large aperture lens system 59 (formed of lenses 59a, 59b) so as to form an image nearly at the right eye point. Consequently, when the viewer's right eye is precisely in a region near the right eye point, the viewer sees a bright display image. In fact, nearly all of the emitted light that is reflected by the display surface enters the viewer's right eye and is imaged onto the retina. Thus, the image may be too bright. In order to provide a wider exit pupil, and at the same time to reduce the intensity of the image that is seen by the viewer, a diffusion plate 62 is used. With it, bright images having an even illumination can be viewed with ease, since the wider exit pupil no longer requires the observer's right eye to be precisely aligned near the right eye point. Therefore, the viewer can view images without a sudden change in brightness even when the viewer moves his head relative to the right eye point.

During the following time-division sequence, the image for the left eye is displayed on the DMD panel 57. LED's 61 for the left eye (for instance, those on the left side in the figure) are energized and the inclination angle of the micro mirrors of the DMD 58 is switched so that the light is directed only toward the left eye of the viewer. The LED's 61 for the left eye and the micro mirrors of the DMD 58 are controlled by the controller 38 in the same way as for the right eye. Thus, both the left-eye images and the right-eye images are displayed on the same display. By the repeated, high-speed switching of the LED's on both sides of the display and by the rapidly controlled inclination angles of the micro mirrors of the DMD, 3-D images are perceived due to the left eye and right eye displays providing images having different parallax. Since the LED's and DMD's can be operated at high frequencies, no flicker of the images is perceived despite the images being presented in a time-division manner. Not only is there no flicker, there is also no interference or cross talk between the left and right images. In this manner, a single display panel is used and it is viewed through a large aperture lens so that wide-angle images are achieved. Since the left and right images are displayed on the display panel in a time-division manner, overlapping of the light paths for the left and right eyes, as is present in prior art displays that provide a large eye relief, is avoided. Thus, with this embodiment, a microscope display having both a wide-angle of view and a large eye relief is realized.

However, if too large an eye relief is selected, the microscope may become oversized. Thus, a lesser eye relief may be desirable; for example, one having an eye relief in the range from 10 mm to 100 mm. In this embodiment, when the image for one of the eyes (for instance, the right eye) is displayed on the display panel by the controller 38, each color B, G, R of the LED's 61 is energized in synchronization with the respective B, G, R image components being displayed on the display panel. For intensity gradation of the displayed images, the duration during which the micro mirrors of the DMD reflect the rays to a desired eye point may be adjusted for each pixel, for example, while the LED's 61 emit the color B. Because the DMD's 58 can be operated at a very high frequency, switching control of the micro mirrors enables control of gradation of the displayed color images. The large aperture lens 59 of this embodiment is a combination of a plastic Fresnel lens 59a and a glass lens 59b. This enables both a thinner and lighter design. A Fresnel lens is also used for the diffusion panel 62 at each side of the illumination system. More than one color of the LED's 61 may be energized at a given time. This, in turn, enables a larger exit pupil to be used, which makes viewing even easier. An eye shade 63 is provided around the large aperture lens 59 of the display unit in this embodiment. The eye shade 63 is similar to a flange and its purpose is to prevent light sources behind the viewer's head from being incident on the display and then reflected into the viewer's eyes. With such a configuration, an electronic image display unit can be realized according to the present invention wherein both an operator and an assistant can view wide-angle, 3-D images having a large eye relief from arbitrary positions, while using a common microscope objective portion which reduces the cost and size of the 3-D viewing system.

Embodiment 11

Figure 15:
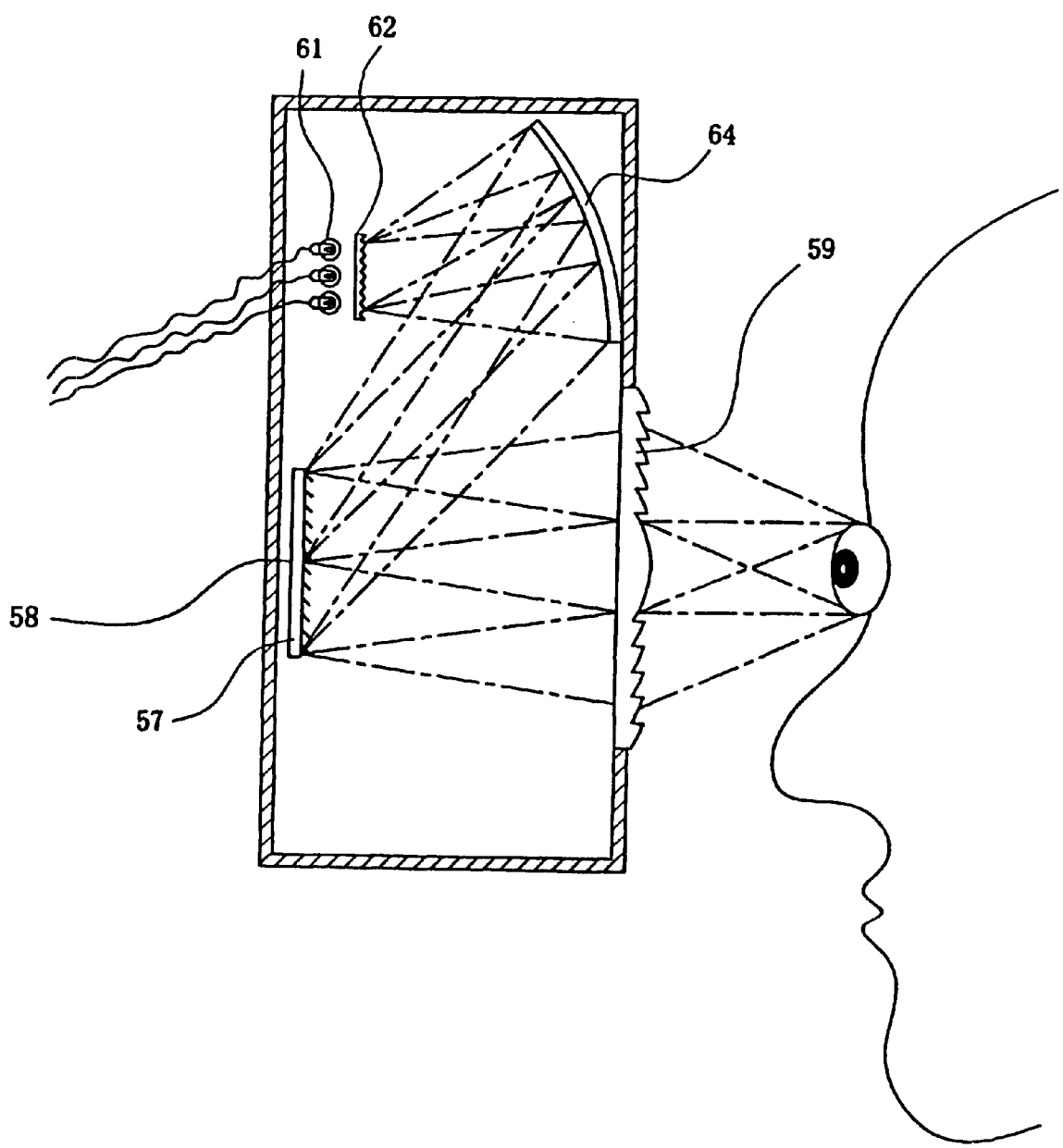
FIG. 15 is a side, sectional view of the display panel of Embodiment 11.
Figure 16:
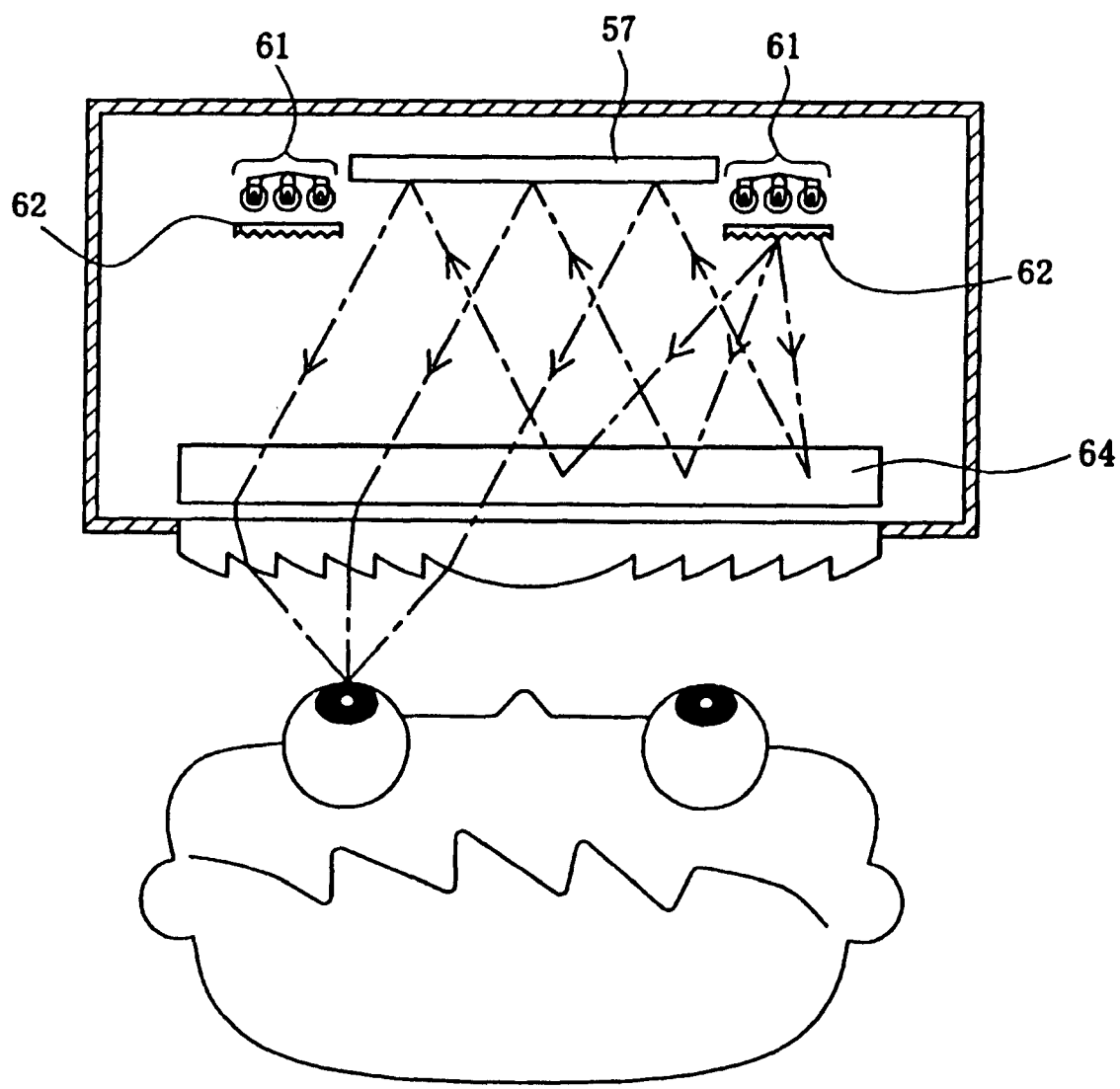
FIG. 16 is a horizontal sectional view of the display unit shown in FIG. 15.

This embodiment is a modified version of Embodiment 10. FIG. 15 is a side, sectional view of the display panel of Embodiment 11 of the 3-D viewing system according to the present invention. FIG. 16 is a horizontal sectional view of the display unit shown in FIG. 15. In this embodiment, two sets (left and right) of red R, green G, blue B LED's 61,61 and diffusion plates 62, 62 are provided above a DMD display panel 57 in order to create images for the left and right eyes, respectively. A curved mirror 64 is provided above a large aperture lens 59 for reflecting the light from the two sets of LED's 61,61 (FIG. 16) and the two diffusion plates 62,62 to the DMD display panel 57. The light emitted from a set of the LED's 61 is diffused by a respective diffusion plate 62, reflected on the mirror 64, and is then directed to the DMD display panel 57. The light from the sequentially energized left and right sets of LED's 61 is then reflected on the DMD's 58 in order to be modulated with image information upon reflection and pass, via the large aperture lens 59 to the viewer's right and left eyes, respectively. As is shown in FIG. 16, the diffusion plate 62 allows imaging using a larger pupil. In this embodiment, the DMD panel 57 displays the right eye image when the right eye LED's 61 (those on the left side in FIG. 16) are energized, and it displays the left eye image when the left eye LED's 61 (those on the right side in FIG. 16) are energized. By performing this alternate display and switching at a high speed, an electronic image display for a surgical microscope can be realized wherein wide-angle, 3-D images are displayed without flicker on a display having a large eye relief In this Embodiment, the micro mirrors of the DMD 58 are driven to change their inclination angles in a binary manner at a high frequency in order to direct the light incident thereon from the left and right LED's 61 to the upper and lower part of the magnifying lens 59. The magnifying lens 59 focuses the light guided onto its upper and lower parts onto the viewer's left and right pupils, respectively. The large aperture lens 59 in this embodiment is formed of a plastic Fresnel lens. Unlike Embodiment 10, this embodiment uses a mirror 64, instead of a focusing lens 60, to illuminate the DMD's. The micro mirrors of the DMD are driven so as to reflect the light either upward and downward. Furthermore, the large aperture lens once again allows the use of a compact DMD display panel 57. Other features of this embodiment do not differ from those in Embodiment 10.

Embodiment 12

Figure 17:
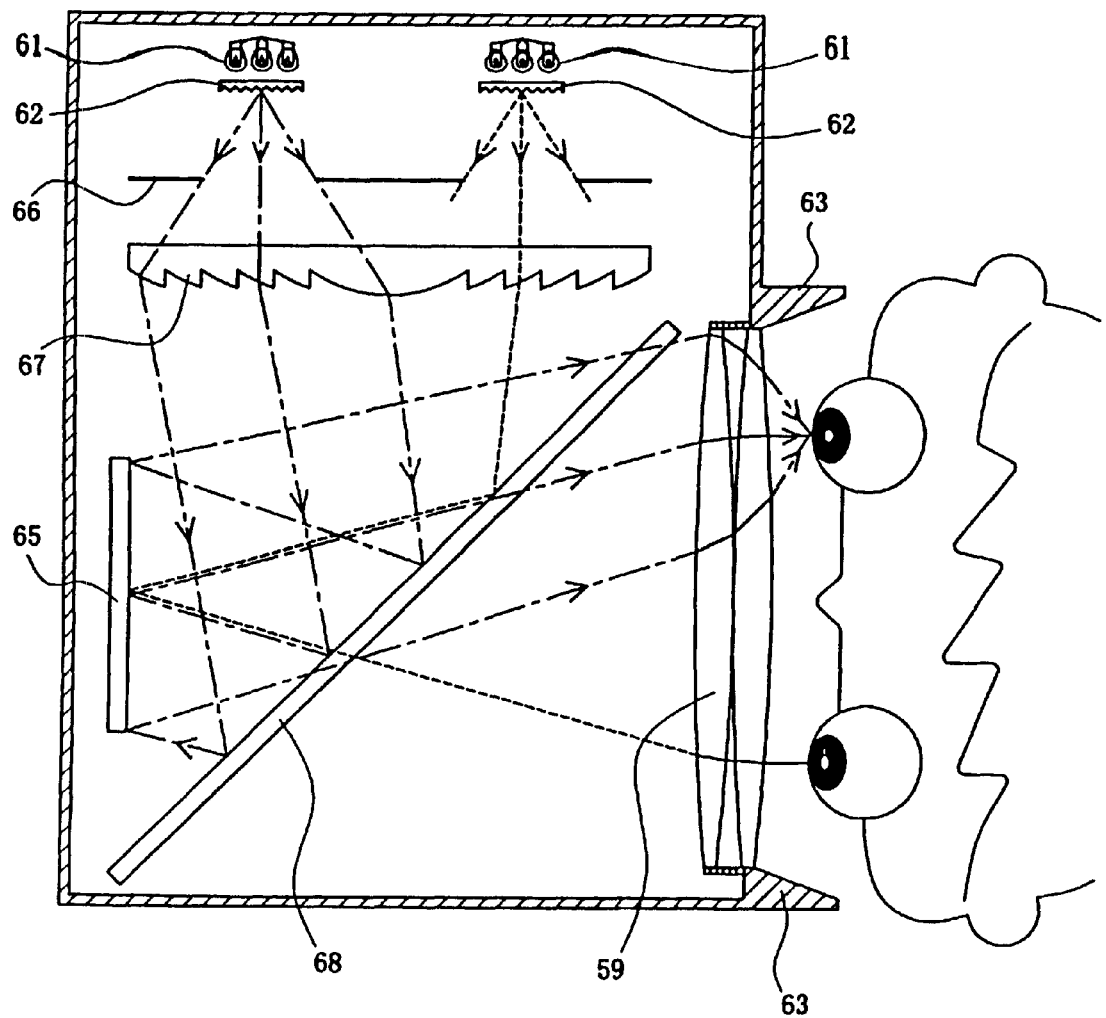
FIG. 17 is a horizontal sectional view of the display panel of Embodiment 12.

FIG. 17 is a horizontal sectional view of the display panel of Embodiment 12 of the 3-D viewing system according to the present invention. In this embodiment, a display panel 65 is formed using a reflective liquid crystal display. Two rows of red, green and blue LED's 61,61, each followed by a diffusion panel 62, are provided on the same side of the display panel 65. In front of the diffusion panel 62, an aperture plate 66 having apertures for passing light directed to a respective eye of the viewer is provided. Further, a single Fresnel lens 67 is provide which gathers the light fluxes restricted by these apertures and focuses them so as to illuminate the entire surface of the display panel 65. A polarized beam splitter 68 is positioned in front of the Fresnel lens 67. The polarized beam splitter 68 reflects predetermined polarized components of the light which has passed through the Fresnel lens 67 in order to illuminate the front surface of the display panel 65, and transmits other predetermined polarized components of the light reflected from the display panel 65 in order to guide the light to the large aperture imaging lens 59.

The large aperture imaging lens 59 then images the light onto the viewer's left and right eye's. In this embodiment, the reflective liquid crystal of the display panel 65 can rotate the polarized direction of the incident light by 0 or 90 degrees. The left and right LED's 61 are controlled so as to be energized sequentially in a time-division manner. Therefore, among the left and right light beams which have been reflected on the polarized beam splitter 68 and reached the display panel 65, only those pixels in which the direction of polarization has been selectively rotated by the display panel 65 can be pass the polarized beam splitter 68 and reach the viewer's eyes. Although not illustrated, the display panels 65 are controlled by electrical signals so as to display images received from one or more image detecting devices in a time-division fashion, so that 3-D image color images are perceive by the viewer without wearing polarized glasses.

The operation of the display unit of this embodiment will now be described. The left and right images are switched by the polarized beam splitter 68. The R, G, B LED's 61 are illuminated sequentially, giving different color properties for the left and right images. Being synchronous with the LED's, images for the left and right eyes are displayed by the reflective liquid crystal 65 for each color. As for gradation, the reflective duration of each pixel of the reflective liquid crystal in the display panel is controlled to adjust gradation while each color of the LED's 61 is illuminated. With this embodiment, using the reflective display panel and the left and right light sources, the left and right images are displayed on a single display in a time-division manner. Polarized glasses are not needed, and a compact 3-D display that provides wide-angle views and a large eye relief is achieved. The display panel 65, instead of being formed of a reflective-type display as described above, may instead be an R, G, B matrix structure, in which case, LED's 61 would preferably all emit white light. In this embodiment the light sources are provided side-by-side. However, the same effects can be obtained when they are stacked vertically.

Embodiment 13

Figure 18:
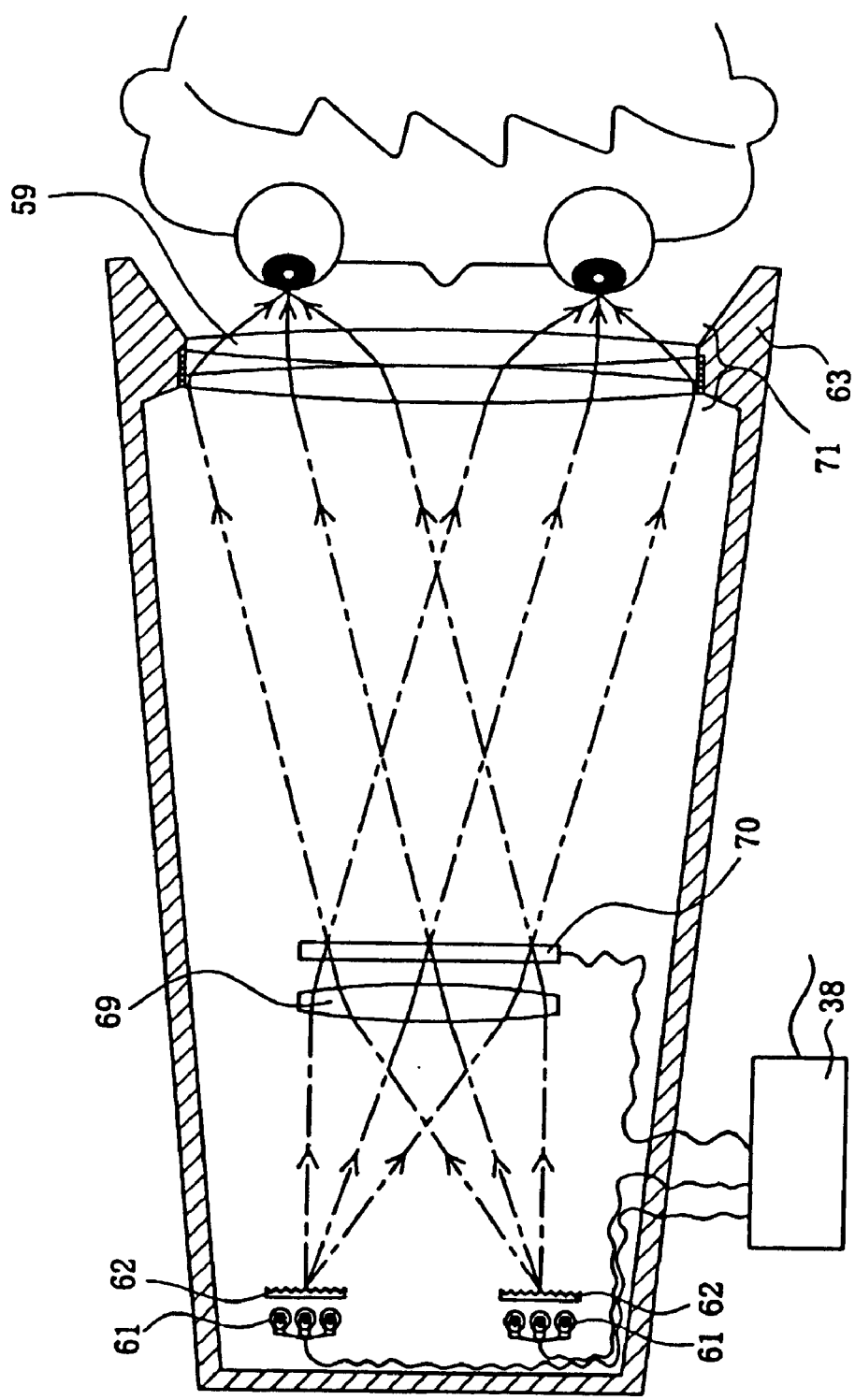
FIG. 18 is a horizontal sectional view of the display panel of Embodiment 13.

FIG. 18 is a horizontal sectional view of the display panel of Embodiment 13 of the 3-D viewing system according to the present invention. In this embodiment, a transmissive liquid crystal display panel is used in lieu of the reflective liquid crystal display panel that was used in Embodiment 12. Left and right sets of R, G and B LED's 61 are provided, as well as a diffusion panel 62, a focusing lens 69, and the transmissive liquid crystal display panel 70. A large aperture lens system 71 is provided that is formed of a large aperture imaging lens and, closer to the eyes, a large aperture magnifying lens. The imaging lens focuses the images from the left and right sets of LED's 61 onto the left and right eyes, respectively. The illumination is effectively gathered into the pupils of the observer and thus bright images are formed. Further, cross talk is prevented in that light intended for the left eye does not reach the right eye and vice versa. The left and right sets of LED's 61 are energized by a controller 38. In synchronism with the LED's being energized, left and right image information is input to the display panel 70 so that the incident light is modulated by the display panel 70. High speed switching of the left and right LED's 61 and image displays on the display panel 70 enables the images to be displayed without flicker. When the transmission-type display panels are used as in this embodiment, the display panels themselves can have R, G, B color mosaics, in which case all the LED's 61, preferably, are selected to emit white light.

Embodiment 14

Figure 19A:
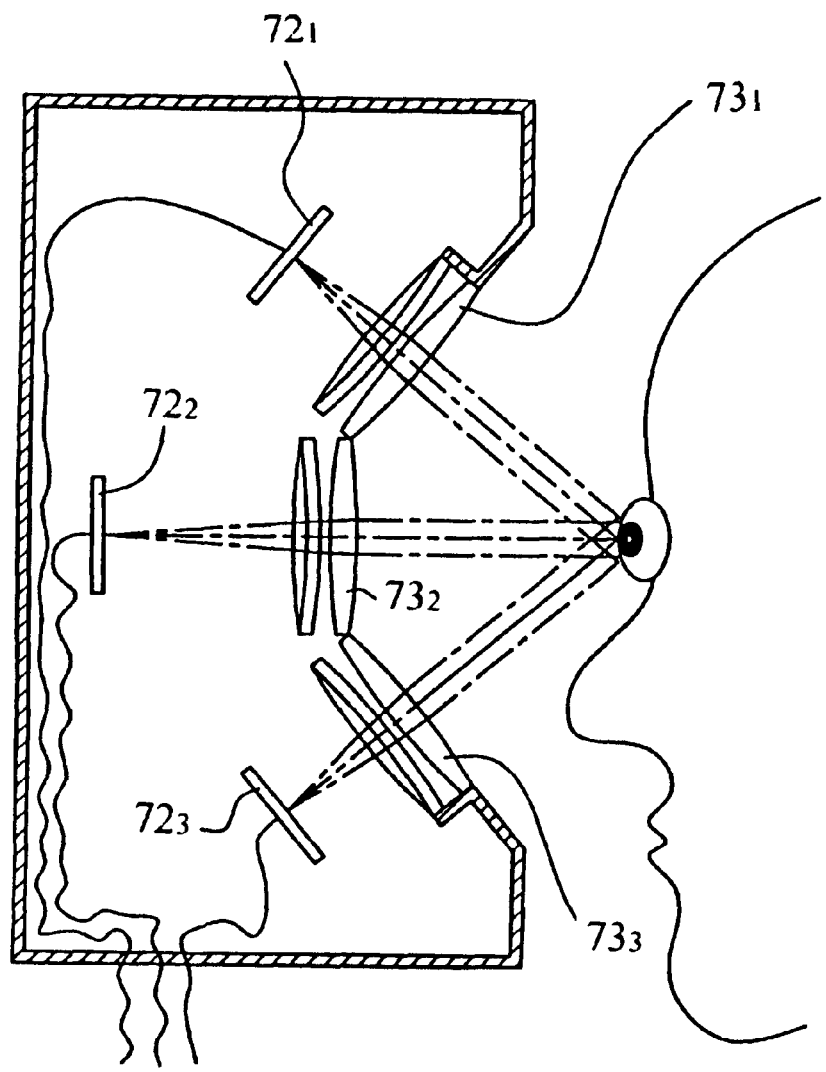
FIG. 19A is a sectional, side view of the display panel of Embodiment 14.
Figure 19B:
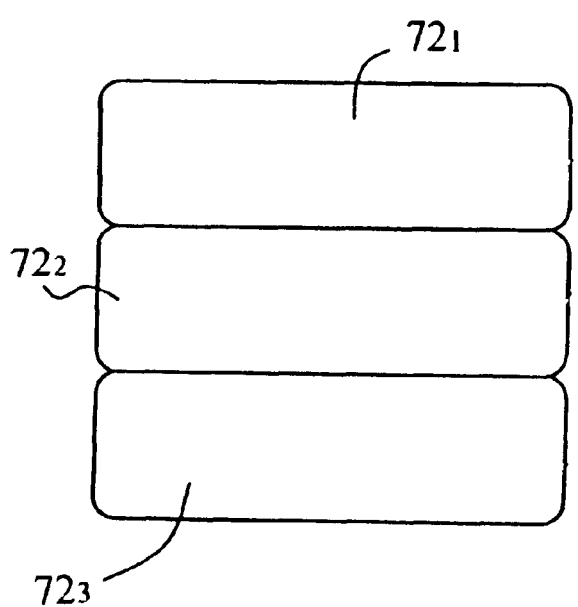
FIG. 19B is a front elevation view of the display panel shown in FIG. 19A.
Figure 20:
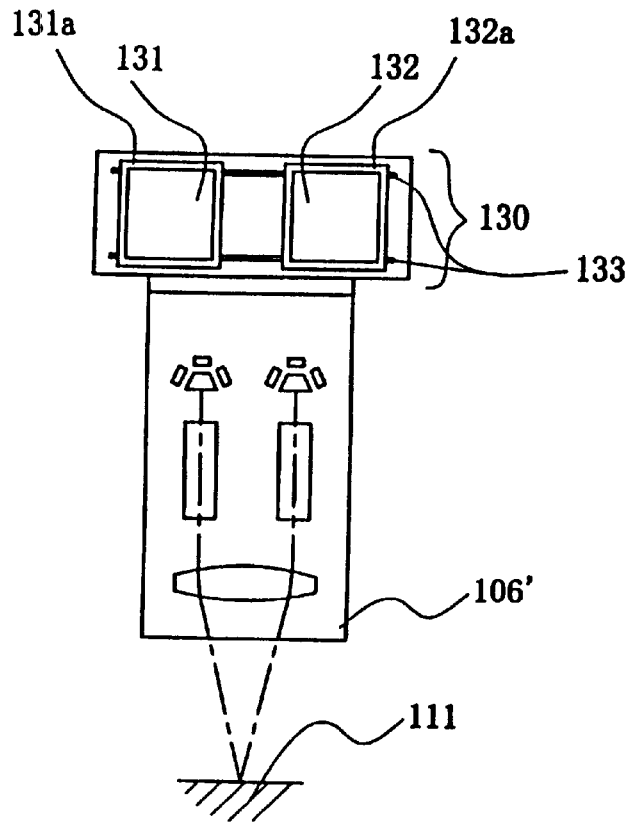
FIG. 20 is a schematic front elevation view of a prior art, 3-D viewing system.
Figure 21:
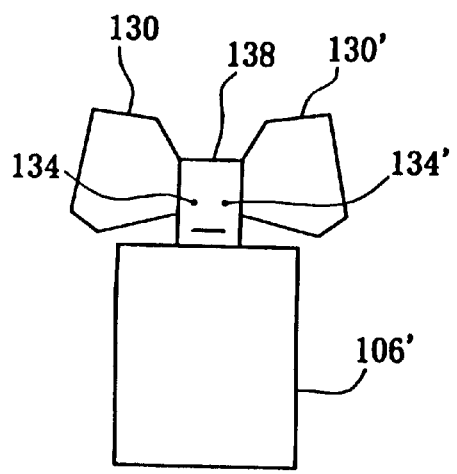
FIG. 21 is a side view of the system shown FIG. 20, illustrating how two viewers can view 3-D images in directions that are opposed to each other.
Figure 28:
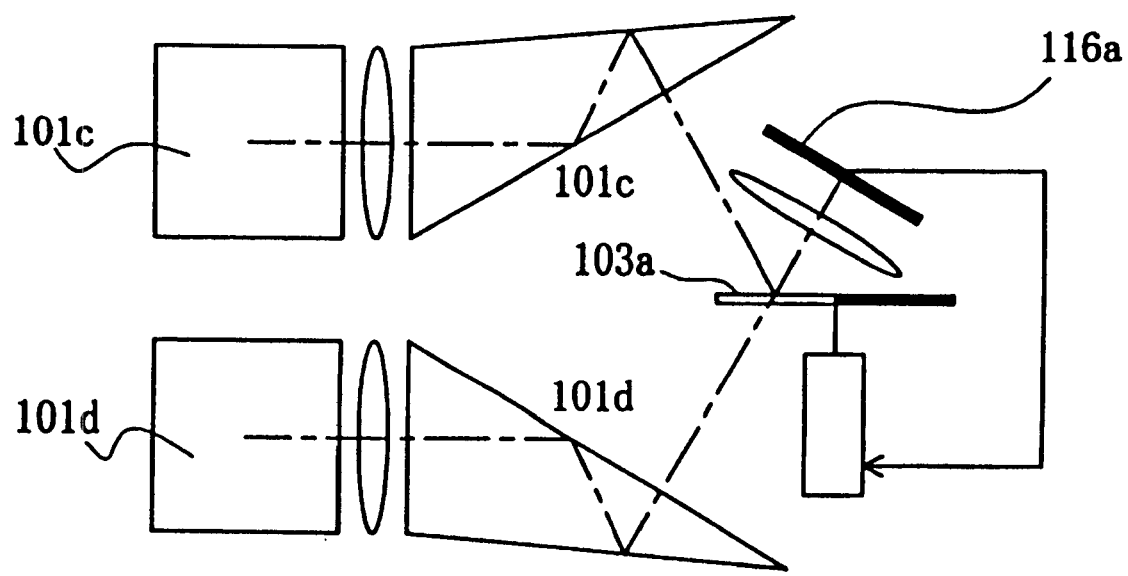
FIG. 28 is a horizontal sectional view of a prior art display that demultiplexes, to left and right oculars, the time-multiplexed signals displayed on a single electronic image display device.

FIG. 19A is a sectional, side view of the display unit of Embodiment 14 of the 3-D viewing system according to the present invention, and FIG. 19B is a front elevation view of the display panels shown in FIG. 19A. The display unit of this embodiment can employ a DMD display panel, a reflective-type liquid crystal display panel or a transmissive-type liquid crystal display panel. This embodiment differs from those presented earlier in that three horizontally-elongated display panels $72_1$, $72_2$, and $72_3$ are used with respective large aperture lenses $73_1$, $73_2$ and $73_3$.

Here, the LED's, diffusion panels, and so on, are not illustrated for clarity of explanation of the operation of the components that are illustrated. In this embodiment, the horizontally elongated display panels $72_1$, $72_2$ and $72_3$ illuminate respective large aperture lenses $73_1$, $73_2$ and $73_3$ so as to create images that are stacked vertically. This arrangement, as shown in FIGS. 19A and 19B, provides a large eye relief as well as a wide-angle of view. In a known manner, the electical signals input to the horizontally elongated display panels $72_1$, $72_2$ and $72_3$ are such that the upper third of the image is input to display panel $72_1$, the middle third of the display image is input to display panel $72_2$ and the lower third of the display image is input to display panel $72_3$. If the upper and lower display panels $72_2$ and $72_3$ project fluxes to the eye of the viewer having a diameter that allows the pupil of the eye to remain within these light fluxes even as the eyeball rotates in its socket as the observer looks upward or downward, the observer can view not only images of wide angle in the horizontal direction, but also images of wide angle in the vertical direction.

The invention being thus described, it will be obvious that the same may be varied in many ways. Such variations are not to be regarded as a departure from the spirit and scope of the invention. Rather the scope of the invention shall be defined as set forth in the following claims and their legal equivalents. All such modifications as would be obvious to one skilled in the art are intended to be included within the scope of the following claims.

What is claimed is:

1. A 3-D viewing system with which multiple viewers can view electronic display images of an object while sharing an optical objective, and wherein at least one of said multiple viewers may change his angular position around the optical objective and head tilt orientation while maintaining a moveable electronic display unit in position for viewing, said system comprising:

an optical objective that is shared among viewers of the 3-D viewing system;

an image detecting unit that detects left and right images having different perspectives;

a moveable electronic display unit that displays images which have been captured by the image-detecting unit; and means to change images that are displayed by the moveable electronic display unit in response to a change in location and tilt orientation of the moveable electronic display unit, wherein the means to change images includes an arm that is rotatable about the optical axis of the optical objective, said arm supporting the moveable electronic display unit, a beam-splitting prism, and two apertures that select light which has been reflected from a surface of the beam-splitting prism, said two apertures passing light to the image detecting unit;

detectors for detecting the location and left-right tilt orientation of the moveable electronic display unit; and a changing means for changing the location and tilt orientation of the image detecting unit in response to a change in location and tilt orientation of the moveable electronic display unit.

2. The 3-D viewing system of claim 1, wherein the image detecting unit includes two image detecting devices.

3. The 3-D viewing system of claim 1, wherein:

the image detecting unit consists of a single image detecting device;

the left and right images are time-division multiplexed onto the image detecting device using a DMD array that is synchronized in operation with the capture of image data by the image detecting unit; and the moveable electronic display unit separately displays the left versus right images to the left versus right eye of a viewer.

4. The 3-D viewing system of claim 1, wherein:

the image detecting unit consists of a single image detecting device that can capture a color image;

the left and right images are multiplexed onto the image detecting device after passing a wavelength selective device for the left image and a wavelength selective device for the right image, each device selecting a different wavelength at a time and changing the selected wavelength in synchronism; and the moveable electronic display unit separately displays the left versus right images to the left versus right eye of a viewer, the left images and right images are full color images reconstructed for each color detected by the image detecting device.

5. The 3-D viewing system of claim 4, and further comprising:

a demultiplexer which demultiplexes color encoded images from different perspectives, said demultiplexer including LED sets and at least one image modulator that are sequentially energized, in time-sequence, in order to form image-modulated light beams that are separately directed to the left and right eye of a viewer, to thereby enable the viewer to view wide-angle images that are perceived as wide-angle, 3-D color images.

6. The 3-D viewing system of claim 5, wherein said at least one image modulator is formed of a transmissive, two-dimensional, liquid crystal array.

7. The 3-D viewing system of claim 5, wherein said at least one image modulator is formed of a reflective, two-dimensional, liquid crystal array.

8. The 3-D viewing system of claim 5, wherein said at least one image modulator is formed of a reflective, two-dimensional, DMD array.

9. The 3-D viewing system of claim 8, wherein pixel intensity gradation is provided by controlling the duty cycle that a given pixel reflects light to the eye during the period that an LED is energized.

10. The 3-D viewing system of claim 1, wherein the images that are displayed on the moveable electronic display unit are monochrome images.

11. The 3-D viewing system of claim 1, wherein color images are displayed on the moveable electronic display unit.

12. The 3-D viewing system of claim 1, wherein:

the image detecting unit consists of a singe image detecting device;

the left and right images are time-division multiplexed onto the image detecting device using a shutter device for the left image and a shutter device for the right image, the shutter devices repeatedly transform between a light transmission state and a light blocking state so that only one of the shutter devices is in the light transmission state at a time, and are synchronized in operation with the capture of image data by the image detecting device; and the moveable electronic display unit separately displays the left versus right images to the left versus right eye of a viewer.

13. The 3-D viewing system of claim 12, and further comprising:

a demultiplexer which demultiplexes color encoded images from different perspectives, said demultiplexer including LED sets and at least one image modulator that are sequentially energized, in time-sequence, in order to form image-modulated light beams that are separately directed to the left and right eye of a viewer, to thereby enable the viewer to view wide-angle images that are perceived as wide-angle, 3-D color images.

14. The 3-D viewing system of claim 13, wherein said at least one image modulator is formed of a transmissive, two-dimensional, liquid crystal array.

15. The 3-D viewing system of claim 1, wherein:

the image detecting unit consists of a single image detecting device;

the left and right images are time-division multiplexed onto the image detecting device using a modulator that modulates a polarized state of the left image and the right image so that the image detecting device can detect the left and right images in a time-division manner by using a liquid crystal cell driven synchronously with the image detecting device; and the moveable electronic display unit separately displays the left versus right images to the left versus right eye of a viewer.

16. The 3-D viewing system of claim 15, and further comprising:

a demultiplexer which demultiplexes color encoded images from different perspectives, said demultiplexer including LED sets and at least one image modulator that are sequentially energized, in time-sequence, in order to form image-modulated light beams that are separately directed to the left and right eye of a viewer, to thereby enable the viewer to view wide-angle images that are perceived as wide-angle, 3-D color images.

17. The 3-D viewing system of claim 16, wherein said at least one image modulator is formed of a transmissive, two-dimensional, liquid crystal array.

18. A 3-D viewing system with which multiple viewers can view electronic display images of an object while sharing an optical objective, and wherein at least one of said multiple viewers may change his position around said objective and head tilt orientation while maintaining a moveable electronic display unit in position for viewing, said system comprising:

the optical objective being shared among operators of the 3-D viewing system;

an image detecting unit that detects left and right images having different perspectives;

a moveable electronic display unit that displays the left and right images which have been captured by the image-detecting unit; and means to change the left and right images that are displayed by the moveable electronic display unit in response to changes in angular position around the objective of the moveable electronic display unit and the tilt orientation of the moveable electronic display unit, said means including detectors which detect the angular position around the objective of the moveable electronic display unit, as well as the left-right tilt orientation of the moveable electronic display unit, by using remote sensing, and changing means for rotating the image-detecting unit about two axes in response to changes in angular position and tilt orientation detected by the detectors.

19. The 3-D viewing system of claim 18, wherein the moveable electronic display unit is head-mounted.

* * * * *